US008737316B2

(12) United States Patent
Haddad et al.

(10) Patent No.: US 8,737,316 B2
(45) Date of Patent: May 27, 2014

(54) HOME AGENT-LESS MIPV6 ROUTE OPTIMIZATION OVER WAN

(75) Inventors: Wassim Michel Haddad, West New York, NJ (US); George Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 12/434,331

(22) Filed: May 1, 2009

(65) Prior Publication Data
US 2010/0278120 A1 Nov. 4, 2010

(51) Int. Cl.
H04W 4/00 (2009.01)
(52) U.S. Cl.
USPC ............ 370/329; 370/338; 370/341; 370/349
(58) Field of Classification Search
USPC ........... 370/328, 329, 331, 338, 389; 713/201
See application file for complete search history.

(56) References Cited

U.S. PATENT DOCUMENTS

| | | | | |
|---|---|---|---|---|
| 8,014,344 | B2 * | 9/2011 | Mahkonen | 370/328 |
| 2003/0200463 | A1 * | 10/2003 | McCabe | 713/201 |
| 2005/0036469 | A1 * | 2/2005 | Wentink | 370/338 |
| 2005/0175002 | A1 * | 8/2005 | Le et al. | 370/389 |
| 2005/0272386 | A1 | 12/2005 | Kawakami et al. | |
| 2008/0291885 | A1 * | 11/2008 | Miao et al. | 370/338 |
| 2009/0073935 | A1 * | 3/2009 | Xia et al. | 370/331 |
| 2009/0116463 | A1 * | 5/2009 | Hirano et al. | 370/338 |
| 2012/0002653 | A1 | 1/2012 | Hirano et al. | |

FOREIGN PATENT DOCUMENTS

| | | |
|---|---|---|
| CN | 101001261 A | 7/2007 |
| CN | 101218802 A | 7/2008 |
| JP | 2005347911 A | 12/2005 |
| JP | 2008042415 A | 2/2008 |
| WO | WO2006083489 | 8/2006 |
| WO | 2007007856 A1 | 1/2007 |

OTHER PUBLICATIONS

International Search Report and Written Opinion—PCT/US2010/032951, International Search Authority—European Patent Office—Aug. 30, 2010.
Johnson Rice University C Perkins Nokia Research Center J Arkko Ericsson D: Mobility Support in IPv6; rfc3775.txt IETF Standard, Internet Engineering Task Force, IETF, CH, Jun. 1, 2004, XP015009555 ISSN: 0000-0003 abstract section 4.2 sectio.
Taiwan Search Report—TW099113984—TIPO—May 9, 2013.

* cited by examiner

Primary Examiner — Brian D Nguyen
Assistant Examiner — Toan Nguyen
(74) Attorney, Agent, or Firm — James K. O'Hare

(57) ABSTRACT

Aspects relate to allowing peer nodes that establish a communication through a home agent to move that session to a directly connected link. Thus, the directly connected nodes can exchange packets natively without encapsulation. Further aspects allow a node that does not have any home agent entity to switch from a local network to a global network without losing ongoing sessions.

25 Claims, 20 Drawing Sheets

HOME AGENT-LESS MIPV6 ROUTE OPTIMIZATION OVER WAN

BACKGROUND

I. Field

The following description relates generally to wireless communications and more particularly to mobility support.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video, and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE), and others.

Standard communication protocols, such as Mobile Internet Protocol, Version 6 (MIPv6), are designed to allow mobile device users to move from one network to another network while maintaining a permanent Internet Protocol address. However, according to MIPv6, for example, even if a first node and a second node are directly connected, all traffic must be sent through a home agent (e.g., from first node to home agent and then to second node, from second node to home agent then to first node, and so forth). Further, if MIPv6 Route Optimization (MIPv6-RO) is utilized, the nodes have to perform a home address test and a care-of address test and then tunnel packets to each other, even if the nodes are directly connected.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with allowing a first node and a second node that are directly connected to exchange packets natively without any encapsulation. In accordance with another aspect, a node that does not have any home agent entity to provide assistance for keeping ongoing sessions alive while switching to foreign networks can switch to a wireless network without losing ongoing sessions.

An aspect relates to a method performed by a first node for route optimization. The method includes employing a processor executing instructions stored on a computer readable storage medium to implement the method, which includes transmitting to a second node a first message that includes an address. Method also includes receiving a second message from the second node over an un-trusted link. The second message is received at the address and includes a first information element and a second information element. Further, method includes transmitting a third message to the second node over a trusted link. The third message is signed with the first information element and the second information element. Communications to the second node are tunneled over the untrusted link.

Another aspect relates to a communication apparatus that includes a memory and a processor. The memory retains instructions related to sending to a peer node a first message that includes an address and receiving from the peer node a second message that includes a first information element and a second information element. The memory also retains instructions related to sending a third message that is signed by the first information element and the second information element. The second message is received over an untrusted path and the third message is sent over a trusted path. Further, the memory retains instructions related to tunneling communications to the peer node over the untrusted path. The processor is coupled to the memory and is configured to execute the instructions retained in the memory.

Still another aspect relates to a communication apparatus that transfers a communication session from a local network to a global network. Apparatus includes means for communicating a first message that includes an address and means for receiving a reply message over the global network. The reply message includes a first information element and a second information element. Apparatus also includes means for conveying a second message over the local network. The second message is authenticated with the first information element and the second information element. Further, apparatus includes means for tunneling the communication session over the global network.

A further aspect relates to a computer program product comprising a computer-readable medium, which includes a first set of codes for causing a computer to initiate a communication session with a peer node over a local network path. Computer-readable medium also includes a second set of codes for causing the computer to determine the communication session should be moved to a global network path and a third set of codes for causing the computer to send to the peer node a first message that includes an address that corresponds to the local network path. Further, computer-readable medium includes a fourth set of codes for causing the computer to receive a second message from the peer node over the global network path. The second message includes a first information element and a second information element. Also included in computer-readable medium is a fifth set of codes for causing the computer to convey a third message to the peer node. The third message is sent over the local network path and is authenticated with the first information element and the second information element. Computer-readable medium also includes a sixth set of codes for causing the computer to tunnel communications to the peer node over the global network path.

Yet another aspect relates to at least one processor configured to initiate a communication session over a local network path and switch the communication session to a global network path. The at least one processor includes a first module for establishing a communication session with a peer node over a local network path and a second module for deciding to switch the communication session to a global network path. Also included in the at least one processor is a third module for conveying a first message to the peer node. The first message includes an address that corresponds to the local network path. Also included is a fourth module for receiving a reply message from the peer node. The second message is received over the global network path and includes a token and a nonce index. Further, the at least one processor includes a fifth module for transmitting a second message to the peer node. The second message is transmitted over the local network path and is authenticated with the token and the nonce index. Also included is a sixth module for tunnel communications to the peer node over the global network path.

Still a further aspect relates to a method performed by a first node for moving a communication session from a first network path to a second network path. The method includes employing a processor executing instructions stored on a computer readable storage medium to implement the method, which includes receiving a first message from a second node. The first message includes an address. Method also includes transmitting a second message to the second node. The second message is transmitted over a first network path and includes a first information element and a second information element. Further, method includes receiving a third message from the second node. The third message is received over a second network path. Further, method includes determining the third message is signed with the first information element and the second information element and tunneling the communication session with the second node over the first network path.

Another aspect relates to a communication apparatus comprising a memory and a processor. The memory retains instructions related to establishing a communication session with a peer node over a local network, receiving a first message that includes an address, and sending a reply message to the address over a global network. The reply message includes a first information element and a second information element. The memory also retains instructions related to receiving a second message over the local network and determining the second message is authenticated with the first information element and the second information element. Further, the memory retains instructions related to tunneling communications with the peer node over the global network. The processor is coupled to the memory and is configured to execute the instructions retained in the memory.

Another aspect relates to a communication apparatus that transfers a communication session from a local network to a global network. Apparatus includes means for receiving a first message from a peer node. The first message includes an address and means for transmitting a second message to the second node. The second message is sent over a first path and includes a first information element and a second information element. Apparatus also includes means for receiving a third message from the second node. The third message is received over a second path. Further, apparatus includes means for ascertaining the third message is signed with the first information element and the second information element and means for tunneling communications with the second node over the untrusted path.

Yet another aspect relates to a computer program product comprising a computer-readable medium. The computer-readable medium includes a first set of codes for causing a computer to initiate a communication session with a peer node over a local network path and a second set of codes for causing the computer to receive from the peer node a first message that includes an address that corresponds to a local network path. Computer-readable medium also includes a third set of codes for causing the computer to transmit a second message to the address over the global network path. The second message includes a first information element and a second information element. Further, computer-readable medium includes a fourth set of codes for causing the computer to receive a third message over a local network path and a fifth set of codes for causing the computer to determine the third message is authenticated with the first information element and the second information element. Also included in computer-readable medium is a sixth set of codes for causing the computer to tunnel communications to the peer node over the global network path.

Still another aspect relates to at least one processor configured to initiate a communication session over a local network path and switch the communication session to a global network path. The at least one processor includes a first module for establishing a communication session with a peer node over a local network path and a second module for receiving a first message from the peer node, the first message includes an address that corresponds to the local network path. The at least one processor also includes a third module for sending a reply message to the address. The second message is sent over a global network path and includes a token and a nonce index. Further, the at least one processor includes a fourth module for receiving a second message. The second message is received over the local network path. Also included are a fifth module for determining the second message is authenticated with the token and the nonce index and a sixth module for tunneling communications over the global network path.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
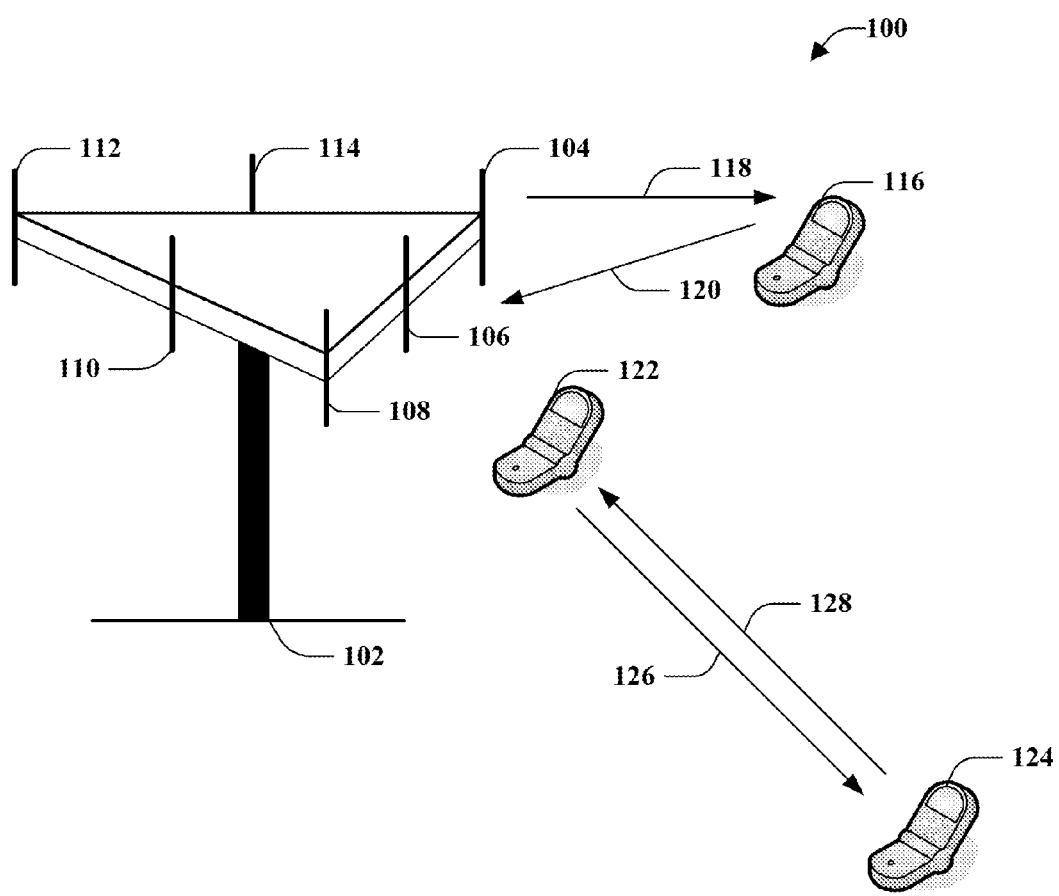
FIG. 1 illustrates a wireless communication system in accordance with various aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so forth, discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, illustrated is a wireless communication system 100 in accordance with various aspects. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some aspects, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some aspects, nodes can be mobile (e.g., wireless), static (e.g., wired), or combinations thereof (e.g., one node static and a second node mobile, both nodes mobile, and so forth).

Figure 2:
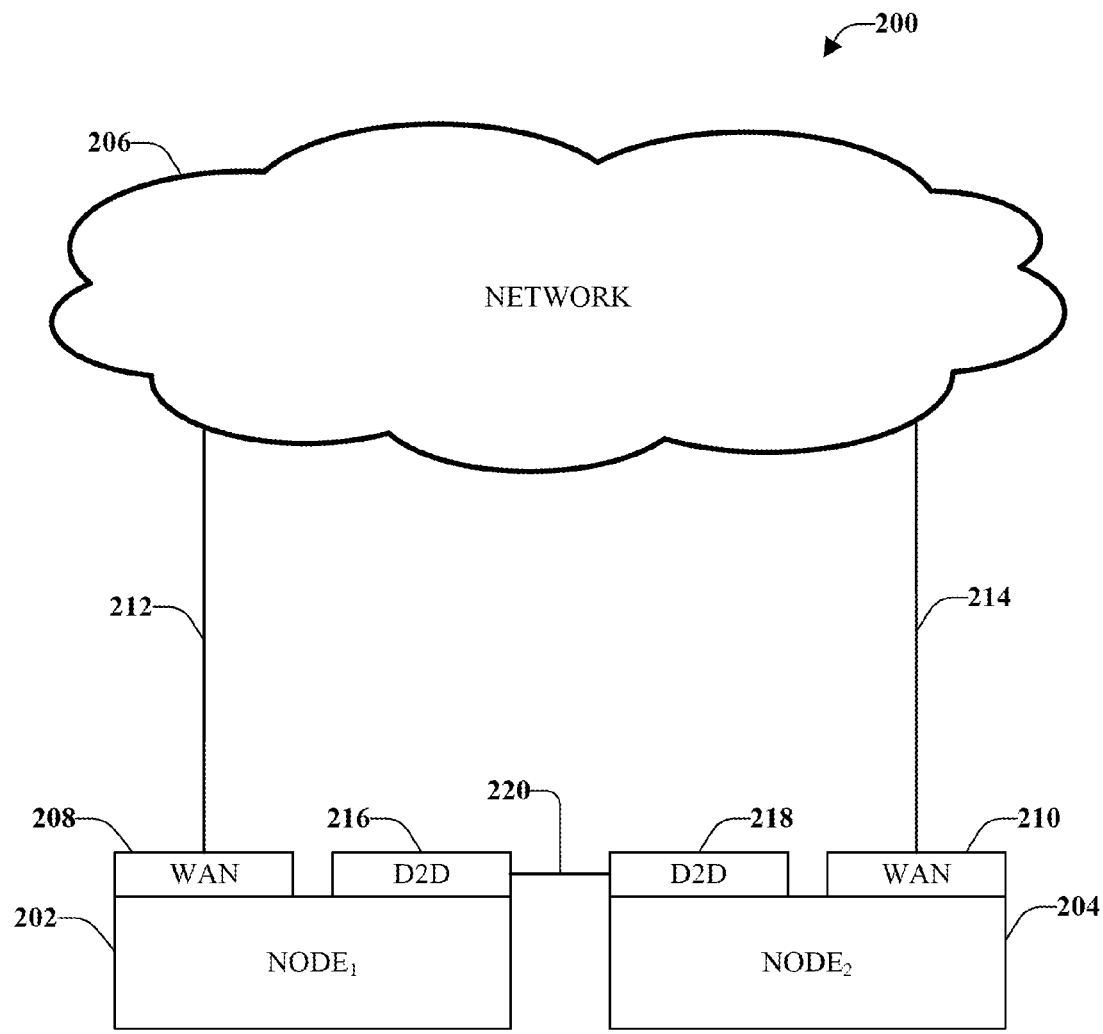
FIG. 2 illustrates a system that allows two nodes to communicate over a Wide Area Network interface and/or a Device to Device interface, according to an aspect.

FIG. 2 illustrates a system 200 that allows two nodes to communicate over a Wide Area Network interface and/or a Device to Device interface, according to various aspects. Included in system 200 are a first node ($Node_1$) 202 and a second node ($Node_2$) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, or any other technology providing interconnectivity and routing to a network of interest (e.g., the Internet).

Interfaces of nodes 202 and 204 can be wired (e.g., Device to Device), wireless (e.g., Wide Area Network (WAN)), or combinations thereof. For example, $Node_1$ 202 interface can be wireless and $Node_2$ 204 interface can be wired, or $Node_2$ 204 interface can be wireless and $Node_1$ 202 interface can be wired, both interfaces 202 and 204 can be wireless, or both interfaces 202 and 204 can be wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN), FlashLinQ®, or another device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various aspects for starting a session over network 206 and moving to a direct session (e.g., over direct link 220) will now be described. For example purposes, it is assumed that $node_1$ 202 utilizes Mobile Internet Protocol. Communications are performed by $node_1$ 202 utilizing its Mobile IP home address as a source address. A home address is a unicast routable address assigned to a node and is used as the permanent address of the node. $Node_1$ 202 communicates with $node_2$ 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various aspects, or a route optimization tunnel directly to $node_2$ 204. Route optimization will be discussed in further detail below.

Figure 3:
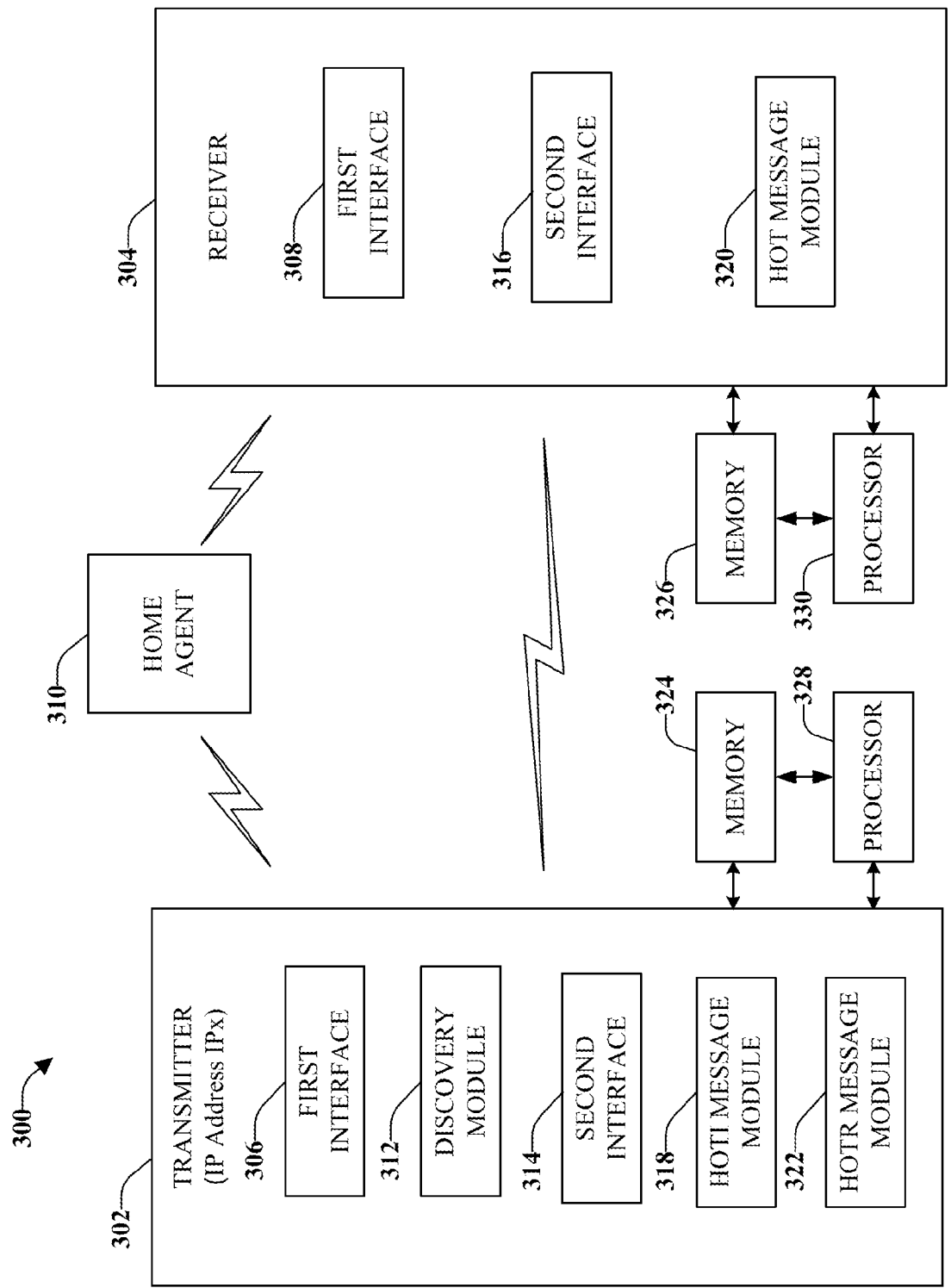
FIG. 3 illustrates a communication system that utilizes route optimization for directly connected devices, according to an aspect.

FIG. 3 illustrates a communication system 300 that utilizes route optimization for directly connected devices, according to an aspect. System 300 can be configured to allow devices that originated a communication session over a network path to move that session to a directly connected path when the devices are within range of each other and can utilize a direct communication link.

Communication system 300 includes a communication apparatus 302 that is configured to transmit and receive data packets as well as perform other functions associated with communications and/or computing functions. Also included in communication system 300 are a multitude of other communication apparatus, one of which is illustrated at 304. Communication apparatuses 302, 304 can be wired apparatuses, wireless apparatuses, or combinations thereof For explanation purposes, communication apparatus 302 will be referred to as transmitter (e.g., initiator of communication) and communication apparatus 304 will be referred to as receiver. Further, both transmitter 302 and receiver 304 can perform the functions of both transmitting and receiving although for purposes of explanation the functions are illustrated and described as being performed separately by the different apparatuses.

Transmitter 302 includes a first interface 306 that is configured to send and receive packets with a first interface 308 of receiver 304 over a network, such as a WAN network. The packets can be encapsulated in a mobile Internet Protocol (IP) tunnel to a home agent 310. Thus, packets are sent from transmitter 302 to home agent 310 and then to receiver 304. Packets sent from receiver 304 are routed through home agent 310 and then to transmitter 302.

A discovery module 312 is configured to detect peer devices (e.g., receiver 304) within a direct communication range of transmitter 302. Discovery module 312 can detect peer devices utilizing link sensing and/or peer discovery techniques. Based on this detection, discovery module 312 can determine whether receiver 304 can be directly connected with transmitter 302. For example, transmitter 302 and/or receiver 304 can be moved around (if mobile) and, based on this movement, communication apparatuses 302 and 304 might be moved within range of each other such that direct communication (e.g., peer-to-peer communication) can be established over a second interface 314 and 316 of each apparatus, which can be peer-to-peer interfaces.

If communication apparatuses 302 and 304 are directly connected, a Home Test Init (HOTI) Message Module 318 constructs a HOTI message that includes a cookie. HOTI message includes information that indicates that transmitter 302 claims to own IP address IPx.

At substantially the same time as receiving the HOTI message, a Home Test (HOT) Message Module 320 copies the cookie from the received HOTI Message and constructs a HOT Message. HOT Message Module 320 also includes a token in HOT Message. The HOT Message is sent to the IP address of transmitter 302 (e.g., IPx).

If transmitter 302 is associated with the claimed IP address (e.g., IPx), HOT Message is received by transmitter 302. At substantially the same time as receiving HOT Message, a Home Test Response (HOTR) Message Module 322 constructs a HOTR Message that include the IP address (e.g., IPx) and a copy of the token from the received HOT Message.

Receipt of HOTR message by receiver 304 confirms that transmitter 302 owns the IP address claimed (e.g., IPx). Communication apparatuses 302 and 304 can now send/receive messages over respective second interfaces 314 and 316. Packets can be sent natively over second interfaces 314, 316 without encapsulation headers or encapsulated over the peer-to-peer specific address.

System 300 can include memory 324 operatively coupled to transmitter 302. Memory 324 can store information related to communicating to a node (e.g., receiver 304) an address included in a first message, conveying to the node a second message that includes a first information element received in a reply message from the node, and tunneling messages over a directly connected path. The reply message can be received over a network path and the second message can be conveyed over the directly connected path. If the address is not owned by transmitter 302, the reply message would not be received by transmitter 302. In accordance with some aspects, memory 324 can further retain instructions related to establishing a communication session with apparatus 304 over the network path and deciding to transfer the communication to the directly connected path before sending the first message.

System 300 can also include memory 326 operatively coupled to receiver 304. Memory 326 can store information related to receiving a first message that includes an address of a peer node and transmitting over a network path to the address a reply message that includes a first element. Memory 326 can also store information related to receiving a second message over a directly connected path, determining if the second message includes the first element, and tunneling messages over the directly connected path if the second message includes the first element. In accordance with some aspects, memory 326 also retains instructions related to establishing a session with the peer node over the network path before receiving the first message Memory 324, 326 can be external to transmitter 302 (or receiver 304) or can reside within transmitter 302 (or receiver 304). Respective processors 328 and 330 can be operatively connected to transmitter 302 or receiver 304 (and/or memory 324, 326) to facilitate analysis of information related to mobility management in a communication network. Processors 328, 330 can be processors dedicated to analyzing and/or generating information exchanged by transmitter 302 and/or receiver 304, processors that control one or more components of system 300, and/or processors that both analyze and generate information exchanged by transmitter 302 and/or receiver 304 and control one or more components of system 300.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
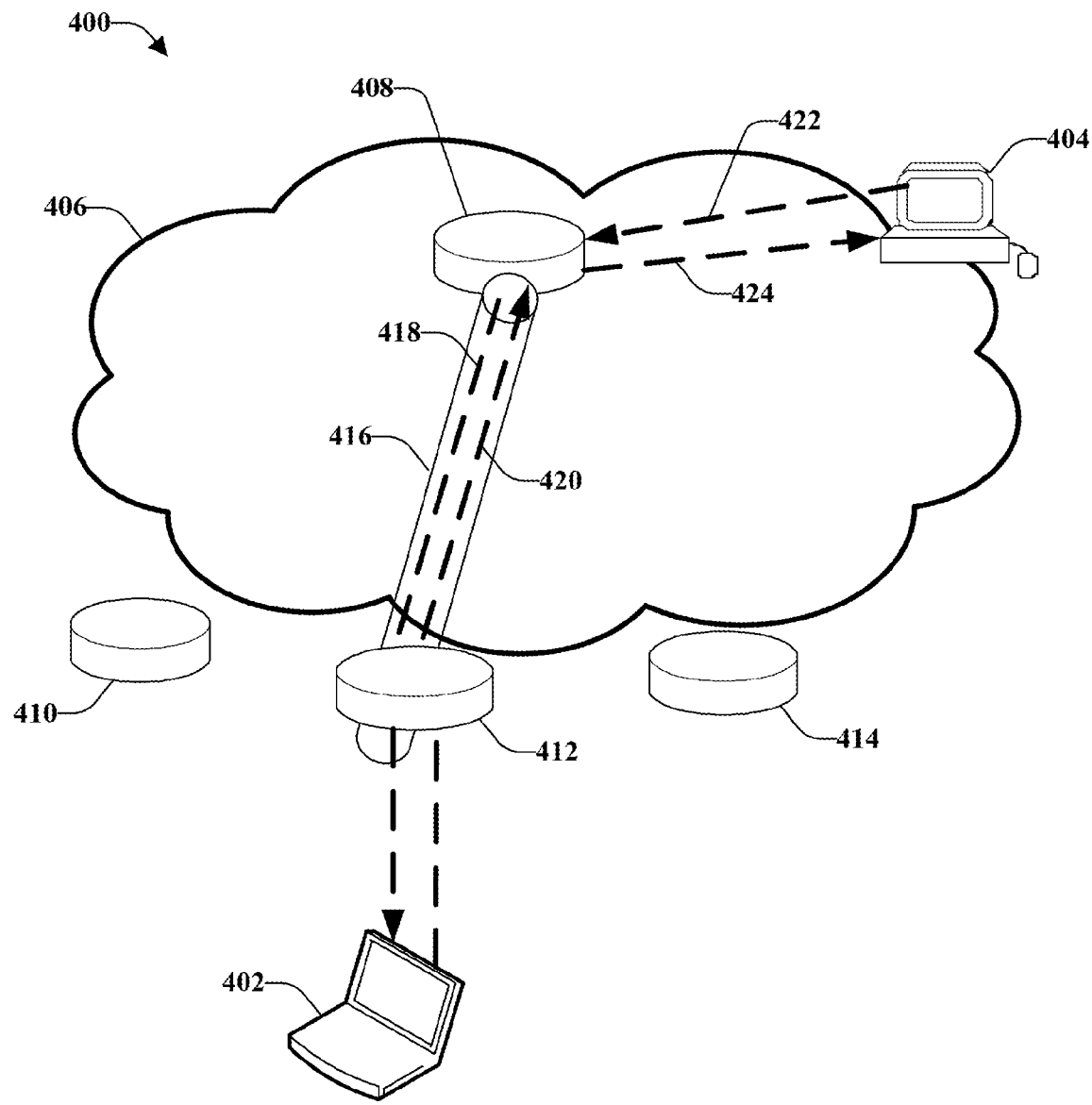
FIG. 4 illustrates a schematic representation of Mobile Internet Protocol tunneling though a home agent in accordance with traditional systems.

In order to fully appreciate the disclosed aspects, FIG. 4 illustrates a schematic representation 400 of Mobile Internet Protocol (IP) tunneling though a home agent in accordance with traditional systems, such as Mobile Internet Protocol, Version 6 (MIPv6). Illustrated is a mobile node 402 that is in communication with a correspondent node 404. Although mobile node 402 is illustrated as a laptop and correspondent node 404 is illustrated as a desktop computer, the disclosed aspects are not so limited and mobile node 402 and/or correspondent node 404 can be other types of devices, both wired and/or wireless.

Mobile node 402 and correspondent node 404 can communicate over a network 406 through interaction with an entity referred to as a home agent 408. Mobile node 402 is associated with a home address, which is a unicast routable address assigned to mobile node 402. The home address can be assigned by a validation entity (not shown), which can be an operator, an access provider, a peer to peer spectrum provider, or another appropriate authorization entity, which can include a FlashLinQ Ticket Issuer. The home address is used within mobile node's 402 home link and standard Internet Protocol routing mechanisms deliver packets to mobile node 402 at its home link. If there are multiple home prefixes on the home link, mobile node 402 can have multiple home addresses.

In accordance with MIPv6, a mobility management mechanism allows mobile node 402 to remain reachable through its home address even though mobile node 402 might be moving around in the IPv6 Internet (e.g., network 406) and irrespective of its current point of attachment to the Internet. For example, there can be various access routers 410, 412, and 414 through which mobile node 402 can connect to obtain access to network 406. For purposes of explanation, mobile node 402 is illustrated as obtaining network 406 access through access router 412. A mobile IP tunnel 416 is created between mobile node 402 and home agent 408 and packets can be encapsulated in tunnel 416.

If mobile node 402 is away from its "home", mobile node 402 is associated with a care-of address that provides information related to mobile node's 402 current location. Mobile node 402 registers its care-of address with home agent 408, which intercepts packets on a home link destined for mobile node's home address, encapsulates the messages, and tunnels 416 the messages to mobile node's care-of address. Thus, IPv6 packets addressed to mobile node's 402 home address are transparently routed to mobile node's 402 care-of address by home agent 408.

Internet Protocol Header for packets from home agent 408 to mobile node 402 (illustrated at dashed line 418) is source address (SA) is the home agent address (HA), destination address (DA) is the care-of address (CoA) (source address (SA) is the correspondent node address (CNAddr), destination address (DA) is the home address (HoA)), which can be written as:

SA=HA, DA=CoA (SA=CNAddr, DA=HoA)

From mobile node 402 to home agent 408 the IP Header for packets (illustrated at 420) is source address (SA) is the care-of address (CoA), destination address (DA) is the home agent address (HA) (source address (SA) is the home address, destination address (DA) is the correspondent node address (CNAddr)), which can be written as:

SA=CoA, DA=HA (SA=HoA, DA=CNAddr)

The IP Header for packets from correspondent node 408 to mobile node 402 (illustrated at 422) are source address is correspondent node address, destination address is the home address or (SA=CNAddr, DA=HoA). From the mobile node 402 to the correspondent node 404 (illustrated at 424) the IP Header for packets is source address is home address, destination address is correspondent node address (SA=HoA, DA=CNAddr).

Figure 5:
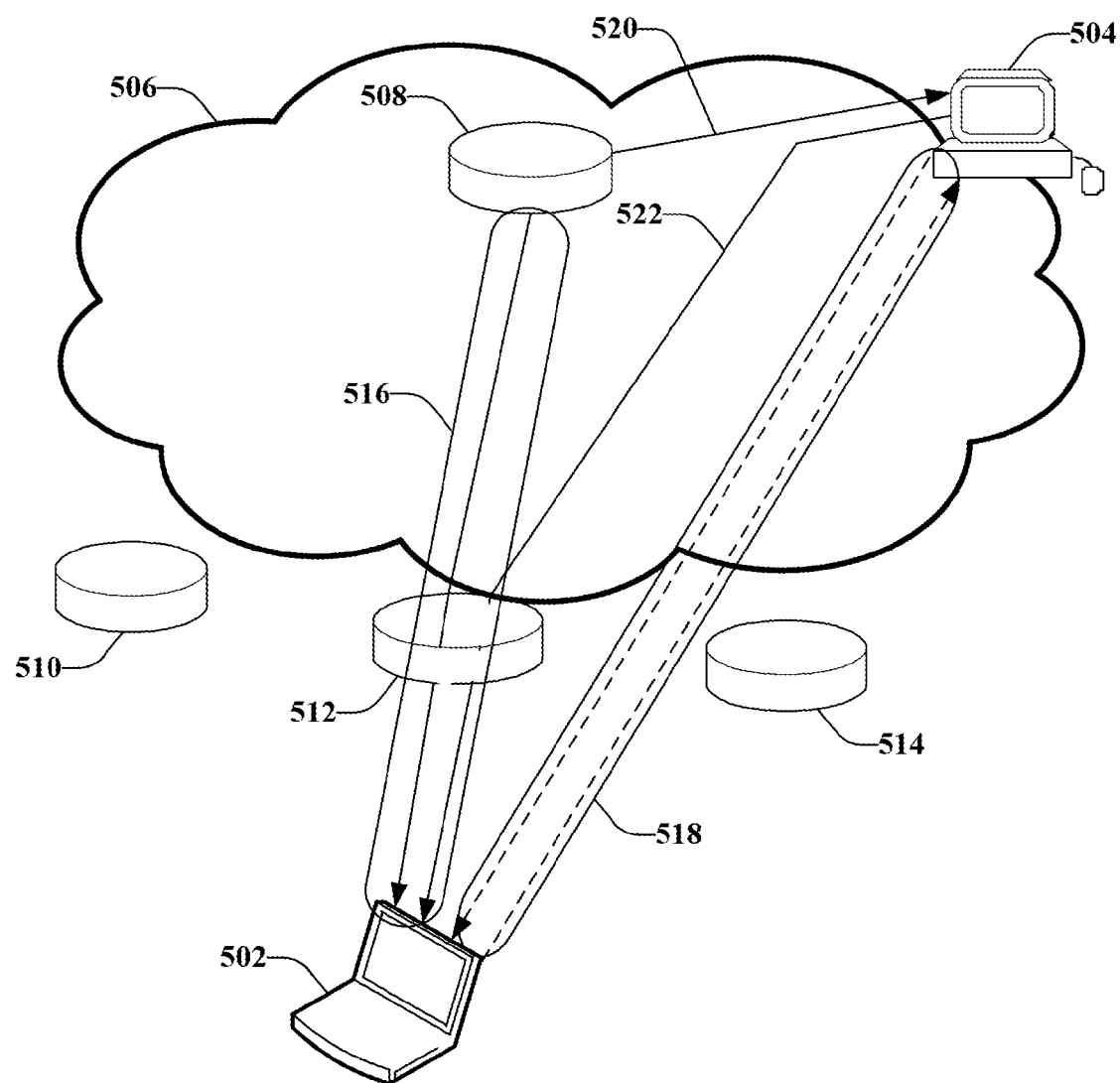
FIG. 5 illustrates a schematic representation of a traditional route optimization procedure and tunneling.

FIG. 5 illustrates a schematic representation 500 of a traditional route optimization procedure and tunneling for Mobile IPv6. Illustrated are a mobile node 502 and a correspondent node 504 that communicate over a network 506 that includes a home agent 508. System 500 can utilize an additional mode of operation referred to as "Route Optimization" or MIPv6-RO. Route Optimization provides that a node, such as mobile node 502 register its current binding (e.g., its care-of address) at correspondent node 504. Thus, packets from correspondent node 504 can be routed directly to mobile node's 504 care of address, bypassing home agent 508. The route optimization procedure requires a home address test and a care-of address test. These tests attempt to assure correspondent node 504 that the home address and care-of address claimed by mobile node 502 are indeed owned by mobile node 502.

In certain situations, correspondent node 504 and mobile node 502 can become directly connected. This condition could be due to accessing the same subnet or having a direct link over WLAN, FlashLinQ®, or other peer-to-peer technology, and/or due to other reasons. If MIPv6 is in use, despite the fact that mobile node 502 and correspondent node 504 are directly connected, all traffic must be sent through home agent 508. If MIPv6-RO is used, mobile node 502 and correspondent node 504 have to perform a home address test and a care-of address test and then tunnel packets to each other, again even if they are directly connected.

The IP Header for packets from correspondent node 504 to mobile node 502 are source address is correspondent node address, destination address is care of address (DO is home address), which can be written as: SA=CNAddr, DA=CoA (DO=HoA). From mobile node 502 to correspondent node 504 the IP Header for packets is source address is care-of address, destination address is correspondent node address (DO is home address), which can be written as SA=CoA, DA=CN (DO=HoA). Illustrated at 516 is the mobile IP tunnel and at 518 is the Mobile IP optimization path. The RO Signaling Home Address test is illustrated at 520 and the Care-of Address Test is illustrated at 522.

Figure 6:
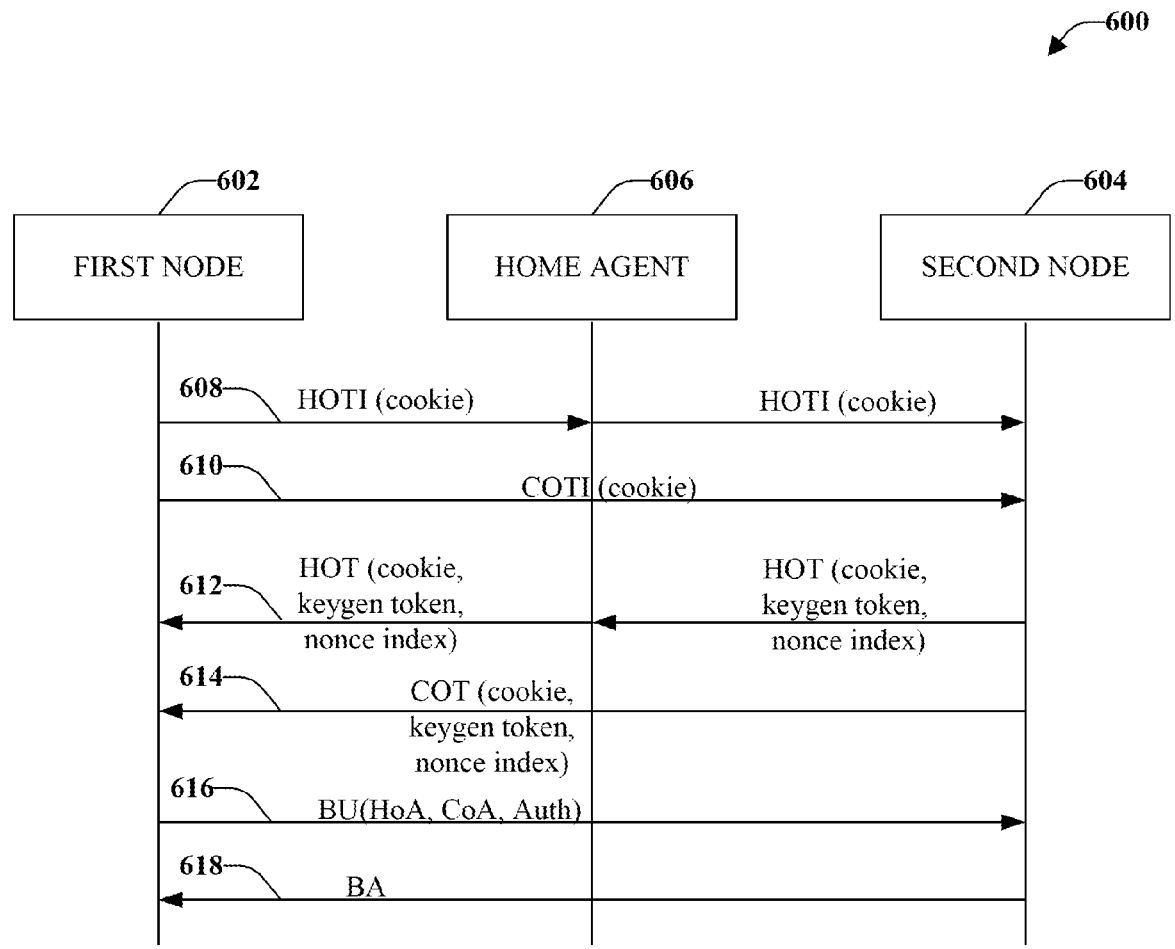
FIG. 6 illustrates a flow diagram of a standard route optimization procedure.

FIG. 6 illustrates a flow diagram 600 of a standard route optimization procedure that can be utilized to allow devices using mobile internet protocol to utilize their Device-to-Device interfaces or D2D links, such as interfaces 216 or 218 of FIG. 2. As illustrated, a first node 602 (e.g., mobile node) desires to communicate with a second node 604 (e.g., correspondent node), which can be facilitated through a home agent 606. To initiate communication with second node 604, first node 602 transmits a Home Test Init Message (HOTI) Message 608 to second node 604 through home agent 606 and over, for example, a WAN interface in order to acquire a home keygen token. A keygen token is a number supplied by correspondent node to enable mobile node to compute a binding management key for authorizing a Binding Update. Home Test Init Message 608 can be sent with a source address, which can be a home address of first node 602. Also included in Home Test Init Message 608 can be a destination address, which is the address of second node 604. Further, Home Test Init Message 608 can include parameters, such as a home Init cookie.

Additionally, first node 602 conveys a Care of Test Init (COTI) Message 610 to second node 604 directly over a D2D interface (not through home agent 606) to acquire a care-of keygen token. Care of Test Init (COTI) Message can be sent with a source address, which can be the care-of address, and a destination address, which can be the address of second node 604. Further, Care of Test Init Message 610 can include parameters, such as a care-of Init cookie.

At substantially the same time as second nodes 604 receives Home Test Init Message 608, second node 604 generates a home keygen token, which can be generated as per the following example:

home keygen token:=First (64, HMAC_SHA1 (Kcn, (home address|nonce|0)))

where | denotes concatenation and the final "0" inside the HMAC-SHA1 function is a single zero octet to distinguish home cookies from care-of cookies. The nonce can be generated by a random number generator, for example.

In reply to Home Test Init Message 608 a Home Test (HOT) Message 612 is transmitted through home agent 606 and, for example, a WAN interface. Home Test Message 612 can include the source address, which is the address of second node 604 and a destination address, which is the home address. Further, Home Test Message 612 can include various parameters, which can include a home init cookie, a home keygen token, and a home nonce index.

At about the same time as second node 604 receives Care-of Test Initiation Message 610, second node 604 generates a care-of keygen token, such as the following:

care-of keygen token:=First (64, HMAC_SHA1 (Kcn, (care-of address|nonce|1)))

In reply to Care-of Test Init Message 610, a Care-of Test (COT) Message 614 is sent. Care-of Test Message 614 is sent directly over a D2D interface to first node 604 (does not go though home agent 606). Contents of Care-of Test Message 614 include a source address (address of second node 604) and a destination address (care-of address). Further, Care of Test Message 614 can include various parameters, which can include a care-of Init cookie, a care-of keygen token, and a care-of nonce index.

First node 602 hashes the tokens together to form a twenty (20) octet binding key Kbm, which in an example can be:

Kbm=SHA1 (home keygen token|care-of keygen token)

It should be noted that the calculations provided herein are examples only. Since equations can be transformed into different forms fairly easily, all such forms of these equation variations are to be encompassed as alternative aspects, where the effect is the same or similar to the effect of the disclosed equations.

A Binding Update 616 can also be utilized to delete a previously established binding. In this situation, care-of keygen token is not used. Instead the binding management key is generated as follows:

Kbm=SHA1(home keygen token)

Second node 604 can reply with a Binding Acknowledgement (BA) 618 to confirm receipt of the Binding Update 616.

Figure 7:
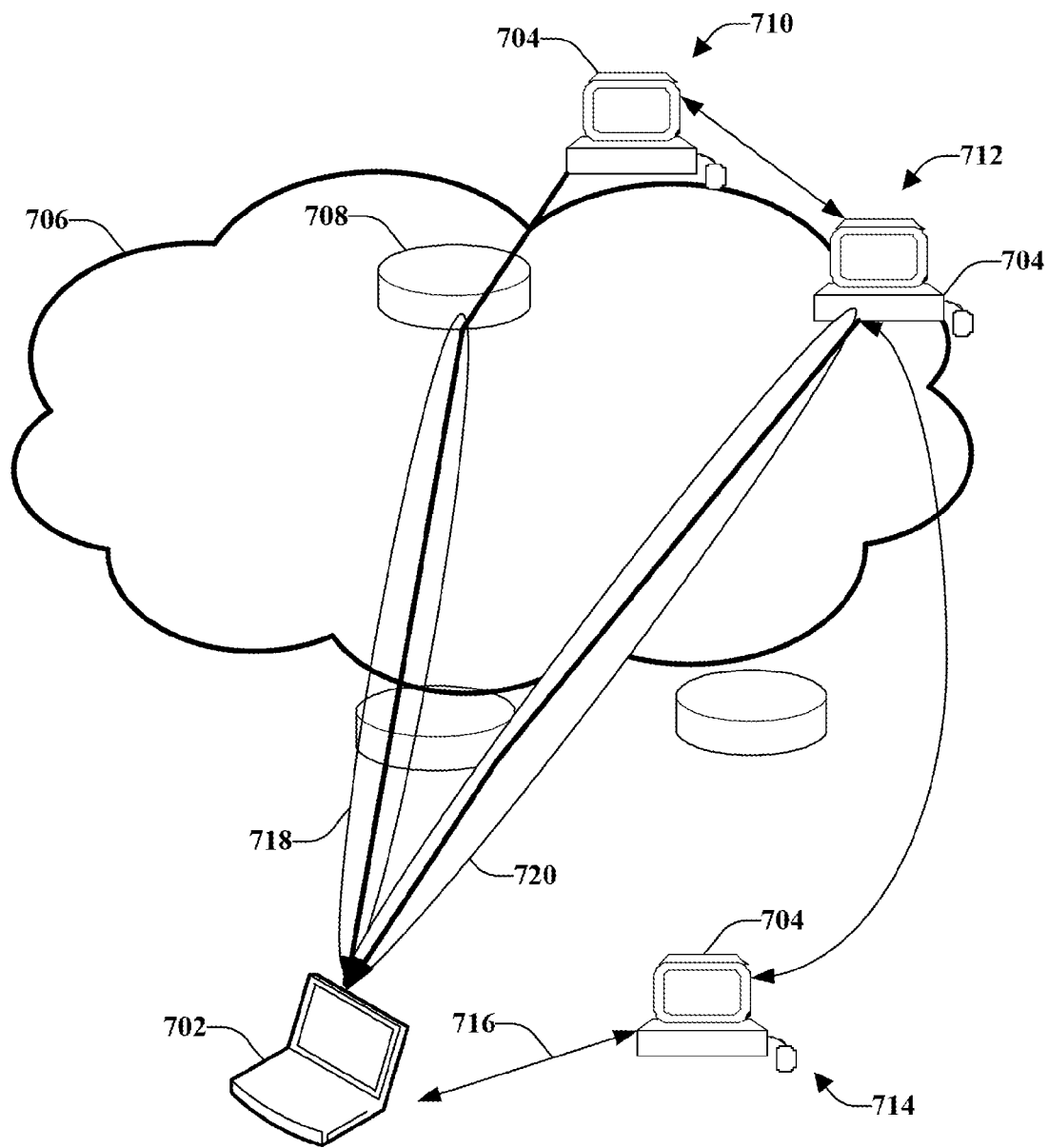
FIG. 7 illustrates schematic representation of tunneling through a home agent, route optimization, and direct link paths.

With reference now to FIG. 7, illustrated is schematic representation of tunneling through a home agent, route optimization, and direct link paths. Illustrated is a first node 702 that communicates with a second node 704 (e.g., correspondent node) over a network 706 that includes a home agent 708.

As illustrated, second node 704 can move from first position 710 to second position 712 and then to a third position 714. In some cases, such as first position 710, routing through home agent 708 is adequate and in other cases, such as second position 712, Route Optimization can be applied. However, in some cases, the two nodes 702, 704 can find themselves directly connected 716 (e.g., third position 714). For example, nodes 702, 704 can be directly connected over a point to point link ad-hoc network, such as FlashLinQ®, peer-to-peer WiFi, BlueTooth®, or other technologies that allow direct, device-to-device communications. According to various aspects, when mobile node 502 and correspondent node 504 are directly connected 716, they can exchange packets natively without any encapsulation. This provides advantages since the time necessary to conduct home address test and care-of address test is not needed, which can save time and other system resources.

An IP Header Format for packets from second node 704 (e.g., correspondent node) to first node 702 (e.g., mobile node) over the direct path is source address is correspondent node address, destination address is home address, which can be written as: SA=CNAddr, DA=HoA. From first node 702 to second node 704 over the direct path, the IP Header Format for packets is source address is home address, destination address is correspondent node address, which can be written as: SA=HoA, DA=CNAddr. Illustrated at 718 is the Mobile IP Path and at 720 the Route Optimization Path is illustrated.

The following describes the direct application of Route Optimization on the directly connected case. First node 702 sends a Home Test Init message to second node 704 though a WAN interface and home agent 708. In accordance with some aspects, first node 702 sends the Home Test Init message over the directly connected path (e.g., path 716). Home Test Init Message is sent to acquire a home keygen token. The contents of Home Test Init Message include a Source Address, which is the home address and a Destination Address, which is the address of second node 704. A parameter that can be included in Home Test Init Message is a home init cookie.

Also sent by first node 702 to second node 704 is a Care-of Test Init Message. This message is sent over the directly connected path (e.g., path 716), not though home agent 708. The purpose of Care-of Test Init Message is to acquire a care-of keygen token. Included in Care-of Test Init Message is a Source Address, which is the home address or care-of address (if available on directly connected interface). Also included is the destination address, which is the address of second node 704. A parameter included in Care-of Test Init Message is a care-of Init cookie.

A Home Test Message is sent in response to Home Test Init Message. Home Test Message can be sent though home agent 708 if the Home Test Init message was received over the directly connected path. If the Home Test Init message was received over the WAN interface, Home Test Message is transmitted over the directly connected path. The Home Test Message includes a source address, which is the address of second node 704 and a destination address, which is the home address. Parameters of Home Test Message include a home init cookie, a home keygen token, and a home nonce index.

When second node 704 receives Home Test Init Message, it generates a home keygen token, which can be similar to the following example:

home keygen token:=First (64, HMAC_SHA1 (Kcn, (home address|nonce|0)))

A Care-of Test Message is sent in response to a Care-of Test Init Message. This Message is not sent though home agent 708, it is sent to first node 702 over the directly connected path (e.g., path 716). The contents of Care-of Test Message include a Source Address, which is the address of second node 704 and a Destination Address, which is a home address or care-of address (copied from COTI). Parameters of Care of Test Message are care-of init cookie, care-of keygen token, and care-of nonce index.

At substantially the same time as second node 704 receives Care-of Test Init Message, it generates a care-of keygen token, such as the following example:

care-of keygen token:=First (64, HMAC_SHA1 (Kcn, (care-of address|nonce|1)))

First node 702 hashes the tokens together to form a 20 octet binding key Kbm, which can be similar to:

Kbm=SHA1 (home keygen token|care-of keygen token)

A Binding Update may also be used to delete a previously established binding. In this case, the care-of keygen token is not used. Instead, the binding management key can be generated as follows:

Kbm=SHA1(home keygen token)

Figure 8:
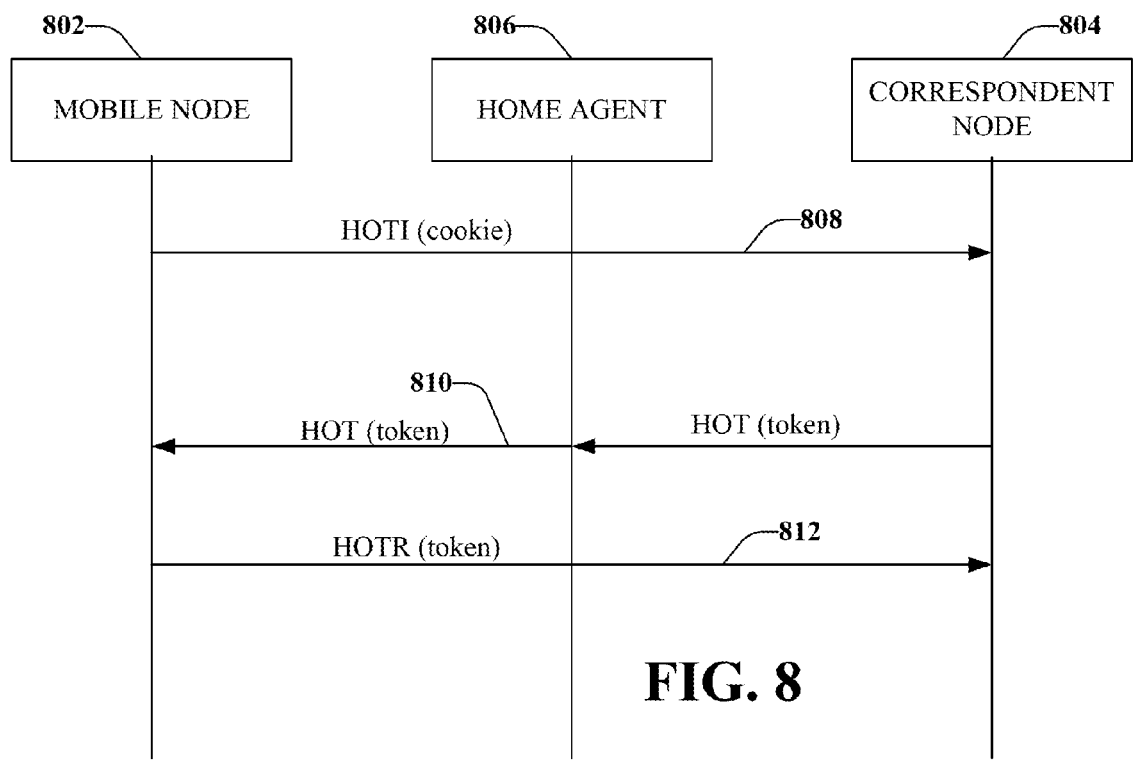
FIG. 8 illustrates a flow diagram of a "Partial-Route Optimization" mechanism, according to an aspect.

The above described route optimizations can be applied in a relatively straight forward manner in the case of directly connected peers (e.g., mobile node and correspondent node). However, the following observations can be made. First, the utility of COTI/COT messages is diminished in this case since on directly connected peers it is not possible to truly test return routability of the addresses claimed to correspond to the directly connected interfaces. Thus, a "Partial-RO" mechanism will now be described in accordance with various aspects disclosed herein and with reference to FIG. 8, which illustrates a flow diagram of a "Partial-RO" mechanism, according to an aspect.

Illustrated are a mobile node 802, a correspondent node 804, and a home agent 806. Mobile node 802 sends a Home Test Init (HOTI) Message 808 to correspondent node 804 to initiate return routability for a home address. Home Test Init Message 808 is sent through the WAN interface and home agent 806. In accordance with some aspects, Home Test Init Message 808 is sent over a directly connect path, as illustrated. The message includes a source address, which is the home address of mobile node 802 and a destination address, which is the address of correspondent node 804. Parameters of Home Test Init Message is a home Init cookie.

In response to Home Test Init Message 808, correspondent node 804 sends a Home Test (HOT) Message 810 though home agent 806 (if the Home Test Init Message was received over the directly connected path), as illustrated. If the Home Test Init Message was received over the WAN interface, the Home Test Message is transmitted over the directly connected path. In such a manner, the HOTI message follows one path and the HOT follows the other path. Thus, the HOTI message can be sent over the WAN/Home Agent and the HOT message over the Direct/D2D, or the HOTI message can be sent over the Direct/D2D and the HOT message can be sent over the Direct D2D.

Home Test Message 804 includes a source address, which is the address of correspondent node 804 and a destination address, which is the home address. Parameters of Home Test Message include a home Init cookie and a token.

A Home Test Response (HOTR) Message 812 is sent over the directly connected path in response to the Home Test Message 810. Included in the Message 812 is a source address, which is the home address and a destination address, which is the address of correspondent node 804. Parameters include a home Init cookie and a token. The token is copied from the token in the Home Test Message.

The above described flow can be utilized to confirm that the home address claimed by mobile node 802 is routing back to mobile node 802. Correspondent node 804 sends the token through home agent 806 using mobile node's 802 home address. If mobile node 802 can return the token to correspondent node 804, it indicates that the home address does point to mobile node 802.

A device, such as device 202 and/or 204 in FIG. 2 should follow a logic flow when deciding when to handoff a session from a WAN interface to a D2D interface. For example, if the source address used for the session is not trusted, then the device should perform the Partial RO process to verify the home address. If the home address is verified (Partial RO process is successful), device can move to the direct link. If the source address used for the session is trusted, then the device can move the session to the direct link without any RO signaling. It should be noted that an address can be trusted if it is verified by other mechanisms (e.g., communicated out of band).

If the D2D interface has its own IP address, then a node should also decide whether to tunnel any communications over that D2D address or to send the communications directly, using the home address directly on the directly connected interface. If the former, then a Mobile type registration message or binding update should be sent to bind the home address (used on the WAN) with the D2D interface address playing the role of a care-of address.

It should be noted that when a Binding Update is sent between directly connected peers, the binding update typically does not need to be secured explicitly since it is usually secured by the directly connected link (assuming sufficient link layer security is provided).

In view of the exemplary systems shown and described herein, methodologies that may be implemented in accordance with the disclosed subject matter, will be better appreciated with reference to various flow charts. While, for purposes of simplicity of explanation, some methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
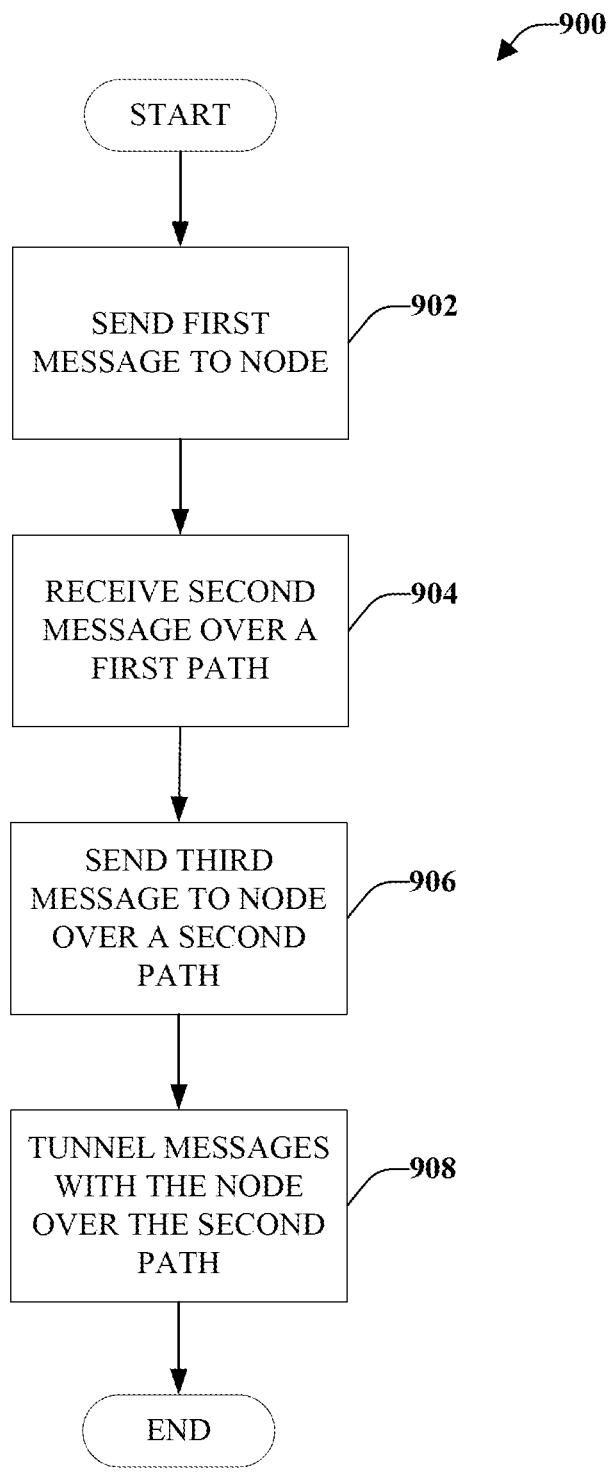
FIG. 9 illustrates a method performed by a first node for moving a communication session from a network path to a directly connected path.

FIG. 9 illustrates a method 900 performed by a first node for moving a communication session from a network path to a directly connected path. The first node might initiate a communication with a second node over a first path, which can be a network path wherein communications are routed through a home agent. The nodes might be moved to a position such that the nodes can be directly connected, which can be determined through link sensing and/or peer-to-peer discovery techniques. Based on this positioning, a determination can be made whether (or not) to move the communication session to the second path (or directly connected path).

If it has been selected to move the session to the second path, at 902, a first message that includes an address is sent to the second node. The address included in first message can be a home address of first node. The first message can be sent through a home agent over the first path. This first message can be sent to initiate a return routability test for the address of first node.

At 904, a second message that includes a first information element is received in reply to the first message. The second message can be received at the address over a second path, different from the first path. In accordance with some aspects, the first information element can be a token generated by the second node.

A third message that includes the first information element is sent to the second node, at 906. The third message can be sent over the second path. Including the first information element in the third message indicates that the address points to first node (e.g., that first node received the second message). At 908, messages are tunneled between the first node and the second node over the second path (e.g., the directly connected path). In accordance with some aspects, the first message can be a Home Test Init Message, the second message can be a Home Test Message and the third message can be a Home Test Response Message.

Figure 10:
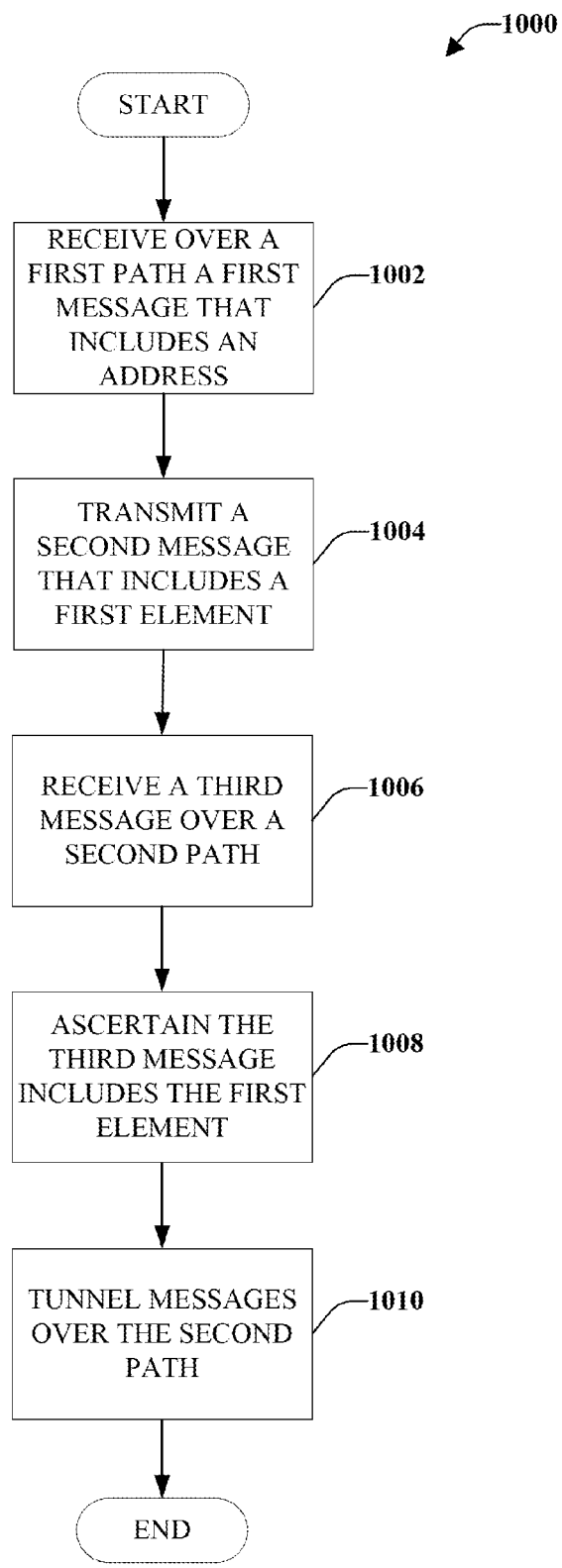
FIG. 10 illustrates a method for switching a communication session from a first communication path to a second communication path.

FIG. 10 illustrates a method 1000 for switching a communication session from a first communication path to a second communication path. A first node can establish a session with a second node over a first communication path, which can be a network link. In accordance with some aspects, an indication can be received that the second node is available over a second communication path, which can be a directly connected path.

At 1002, a first message that includes an address is received from the second node. The first message can be received from a home agent over the first path, wherein the home agent is forwarding the message from the second node. In accordance with some aspects, the first message is received for initiation of a return routability test for the address of the second node. A second message, in reply to the first message, is transmitted, at 1004. The second message can include a first element and can be sent over the second path. The first element can be a token generated by the first node.

At 1006, a third message is received over the second path and, at 1006, it is ascertained if the third message includes the first element. Inclusion of the first element in the third message indicates that the address received in the first message points to the second node. If the third message includes the first element, at 1010, messages are tunneled over the second path. In accordance with some aspects, the first message can be a Home Test Init Message, the second message can be a Home Test Message and the third message can be a Home Test Response Message.

Figure 11:
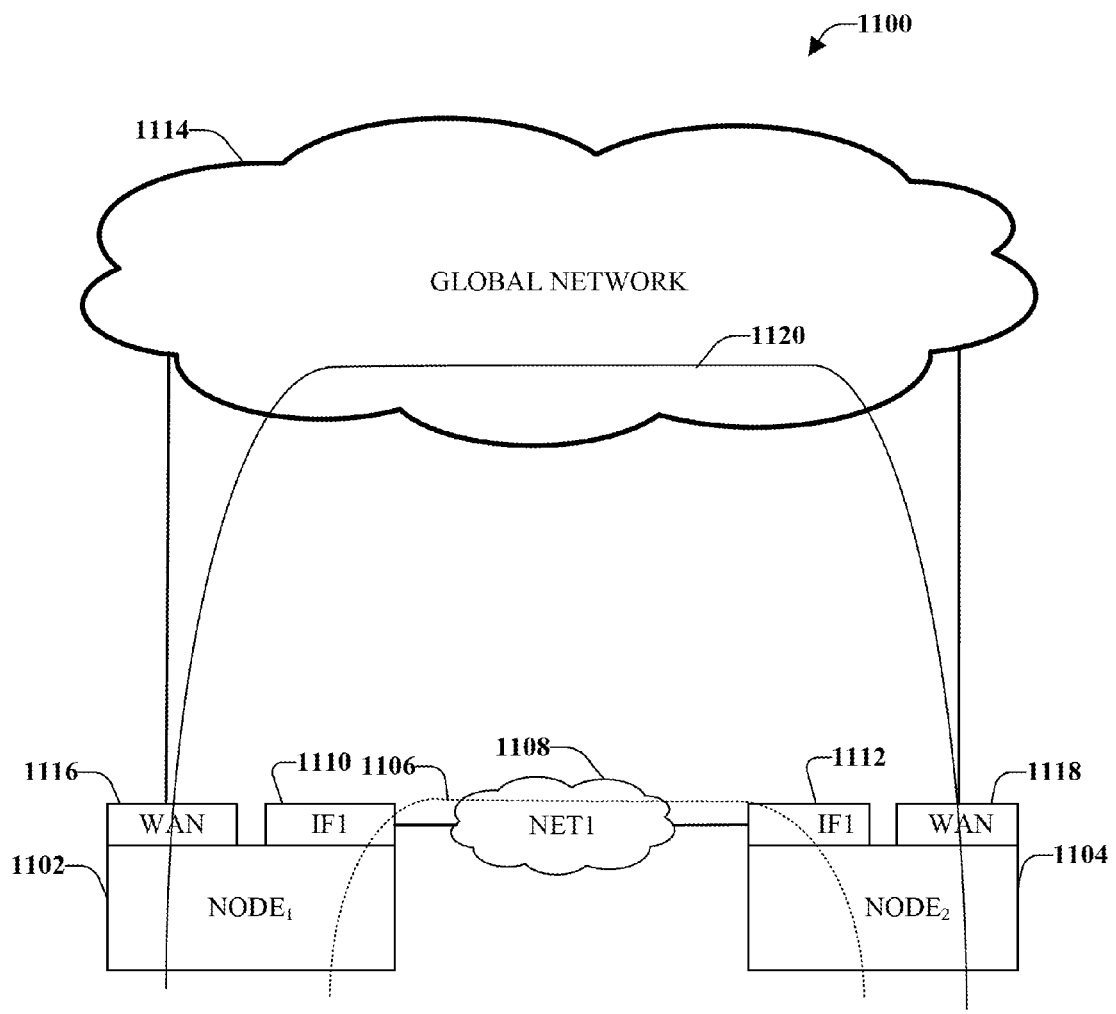
FIG. 11 illustrates a system that is configured to allow nodes to start a session over a local network and move the session to a global network, according to an aspect.

With reference now to FIG. 11, illustrated is a system 1100 that is configured to allow nodes to start a session over a local network and move the session to a global network, according to an aspect. Included in system 1100 is a first node 1102, which is a homeless node (also referred to as homeless mobile node (MN)). As used herein, "homeless" indicates a node that does not have any home agent entity to provide assistance for keeping ongoing sessions alive while switching to foreign networks nor to forward any new incoming request(s) to establish new sessions to the node's current location.

First node 1102 and a second node 1104 can establish a session 1106, over a local network 1108 utilizing a globally unique but not globally routable IPv6 address. The globally unique address can be, for example, an address used within the scope of a local network, such as a WLAN subnet, a device to device direct link, a multi-hop wireless or wired network internally using locally scoped addresses, and so forth. For example, this session can be established over first interfaces 1110, 1112. The address of interface 1110 can be IP_Localscope1 (IP_ls1) and address of interface 1112 can be IP_LocalScope2 (IP_ls2), for example. The IP header for this session 1106 can be, for example (Source Addr=IP_ls1, dest_addr=IP_ls2).

There might be some circumstances when first node 1102 decides to switch to another interface that is attached to a global network 1114 (e.g., 3G network or other network connected to the global Internet). For example, the distance between node one 1102 and node two 1104 might increase and, thus, the nodes 1102 and 1104 might be losing connectivity of the direct link.

Prior to switching its ongoing sessions, first node 1102 performs a procedure with the targeted wireless infrastructure (e.g., Global Network 1114) to optionally authenticate and configure a globally routable IPv6 address. For purposes of explanation, it is assumed that second node 1104 has performed a similar procedure and, thus, has acquired a routable IPv6 address.

In accordance with some aspects, when first node 1102 decides to switch to the WAN, for example, first node 1102 starts a MIPv6 procedure. Instead, however, of signaling going through a home agent (as in a standard route optimization procedure discussed with reference to FIG. 6), the signaling is exchanged without involvement from a home agent. Thus, the initial session 1106 is moved to global network 1114 using MIPv6 RO tunneling and is facilitated through interfaces 1116, 1118 (e.g., WAN interfaces). This session is illustrated at 1120. Interface 1116 can be associated with address IP_GlobalScope1 (IP_gs1) and interface 1118 can be associated with address IP_GlobalScope2 (IP_gs2). The IP headers for this session can be written as:

Source_addr=IP_gs1, dest_addr=IP_gs2
(Source_addr=IP_ls1, dest_addr=IP=ls2)

Figure 12:
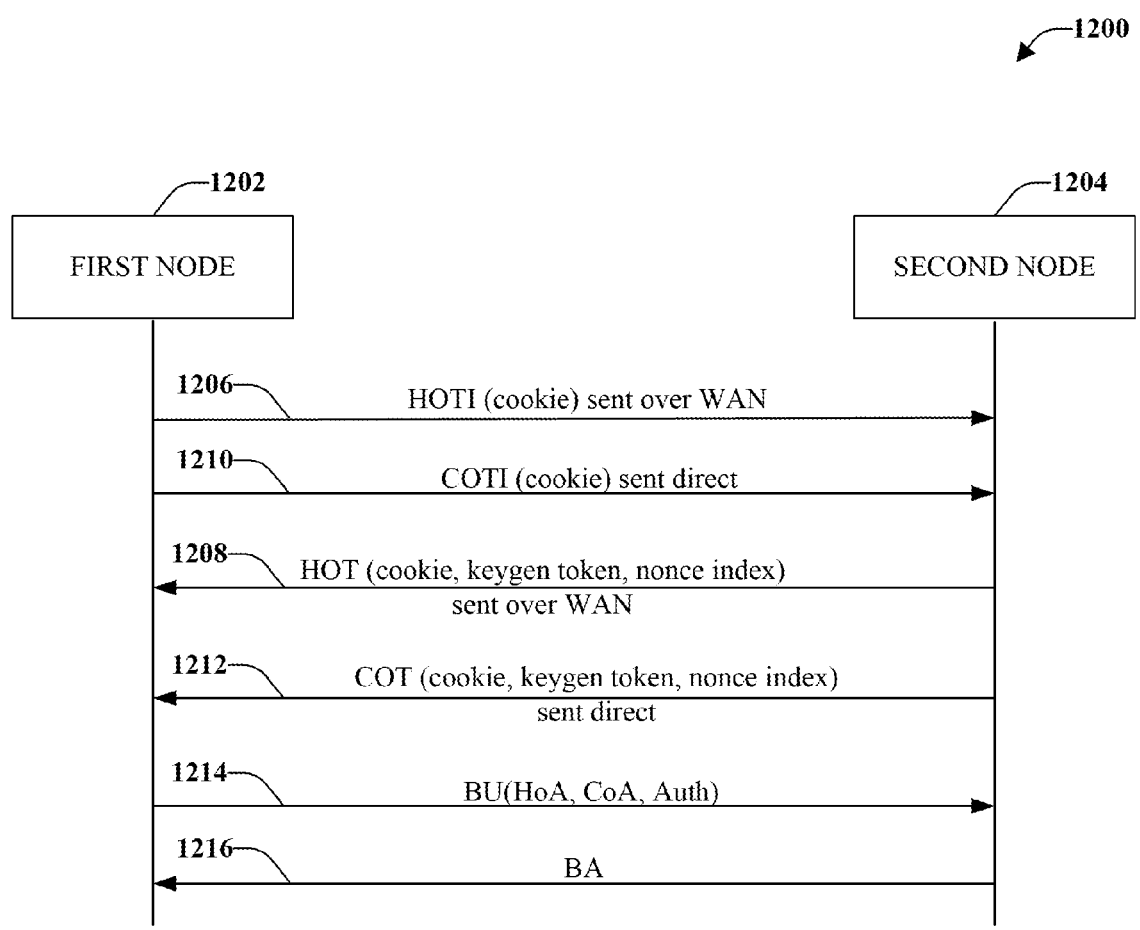
FIG. 12 illustrates a modified route optimization flow diagram in accordance with an aspect.

A modified route optimization according to the above disclosed aspect is illustrated in FIG. 12. A first node 1202 sends to second node 1204 a HOTI Message 1206 over the WAN and second node 1204 replies with a HOT Message 1208 sent over the WAN. These messages 1206, 1208 are sent over the WAN (which is an untrusted link) to test the WAN address (e.g., IP_globalscope1 and IP_globalscope2 from FIG. 11)

Further first node sends a COTI Message 1210 and second node 1204 responds with a COT Message 1212. These messages 1210 and 1212 are exchanged directly over the local network or direct link (which is a trusted link) using the IP_localscope1 and IP_localscope2 addresses of FIG. 11.

Since the session is assumed to have been initiated based on the IP_localscope1 and IP_localscope2 addresses, the IP_globalscope1 and IP_globalscope2 addresses might need to be discovered before the session can be moved to the WAN interface. Different techniques can be utilized to discover the WAN addresses. In accordance with some aspects, the WAN addresses can be exchanged over the direct connection as the connections become available. For example, first node 1202 may have had address globalscope1 configured on its WAN interface before the session with second node 1204 is started. In this case, when the session or connection with second node 1204 was initiated, first node 1202 could have provided second node 1204 with the alternate address (globalscope1).

Continuing the above example, second node 1204, at a later time, configured globaladdress2 on its WAN interface. At that time, second node 1204 can provide globalscope2 address to first node 1202 as an alternate address. Now, both nodes 1202 and 1204 have the other's WAN address, which can be utilized according to various aspects disclosed herein. According to some aspects, the WAN addresses might be manually configured or be known to each device based on Application layer information, domain name server resolution, and so forth.

A Binding Update Message 1214 and a Binding Acknowledgment Message 1216 can be sent to bind the local scoped address (playing the role of a MIPv6 home address) to the global scope address (playing the role of a MIPv6 care-of address). As the existing session generates packets based on the local-scope addresses, these packets are tunneled over an IP header using the global scope addresses for routing over the WAN.

Figure 13:
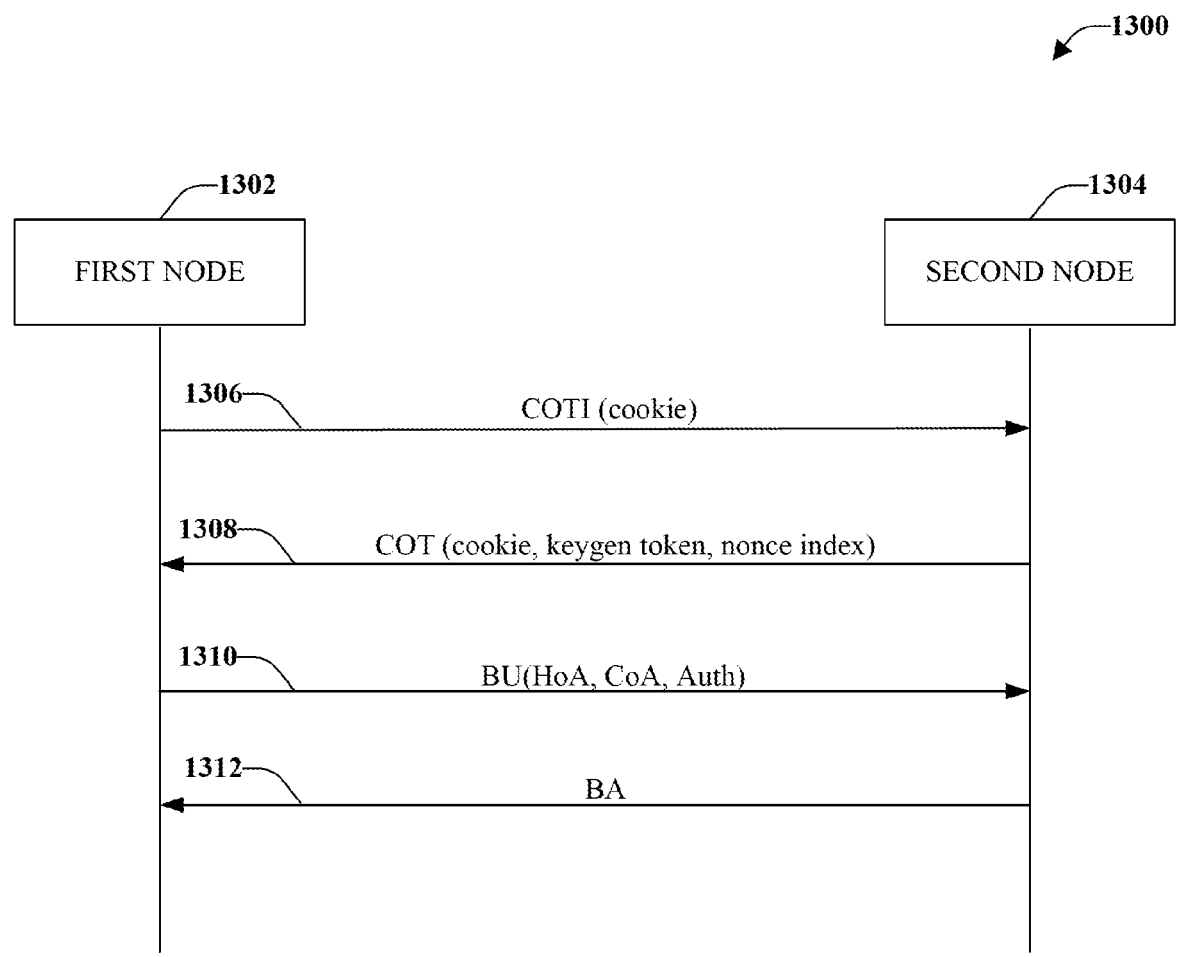
FIG. 13 illustrates a limited route optimization procedure, according to an aspect.

FIG. 13 illustrates a limited route optimization procedure 1300, according to an aspect. A first node 1302 has initiated communication over a local network with a second node 1304 (e.g., correspondent node). When first node 1302 decides to switch to the WAN, first node 1302 initiates a limited return routability procedure. Thus, first node 1302 launches a care-of address reachability test only by exchanging a CoTI Message 1306 and a CoT Message 1308 with second node 1304. In accordance with some aspects, the care-of address reachability test can be performed prior to switching to the WAN interface (it is limited to the care-of keygen token lifetime). After exchanging CoTI Message 1306 and CoT Message 1308, first node 1302 sends a binding update (BU) message 1310, which is authenticated with the care-of keygen token. A Binding Acknowledgment 1312 can be sent by second node 1304 over a trusted link (such as a local link).

There are many security threats that should be addressed. To avoid confusing second node 1304 (e.g., correspondent node) by the lack of a home nonce index in the BU Message 1310, second node 1304 can be allowed to check the home address carried in the BU Message 1310. If the home address of first node is a non-routable address, then second node 1304 should skip the home keygen token and only consider the CoA keygen token.

Another security threat would be to hijack the ongoing connection by a malicious node that has discovered the home address of first node 1304. In this case, the malicious node only needs to perform a CoTI/CoT message exchange with second node 1304 then follow it by sending a BU message. In order to mitigate this threat, the two endpoints (first node 1302 and second node 1304) should separately compute a 64-bit interface identifier (IID) to be used when configuring first node's CoA (note that such address is unique since the WAN should use one prefix per node). For this purpose, the IID can be computed from using the key generated during the pairing procedure. The following can be utilized to generate the CoA IID, according to an aspect:

CoA(IID)=First[64, SHA256(H_Kp|MN(HoA))

where H_Kp is the hash of the key derived from pairing and HoA is the first node's home address.

In accordance with some aspects, using the above CoA (IID) can enable first node 1302 to further mitigate the amount of signaling messages needed to update second node 1304. This can be achieved by avoiding the return routability and directly sending a BU message to the second node 1304. The BU message can be authenticated with H_K. It should be noted that deriving the IID from H_K is different from using Cryptographically Generated Address (CGA) technology, which requires using private/public key to derive and bind IPv6 address(es) to the first node's public key. However, the resulting IID has the property that is can be verified by second node 1304 and should not be predictable by a malicious third party.

Figure 14:
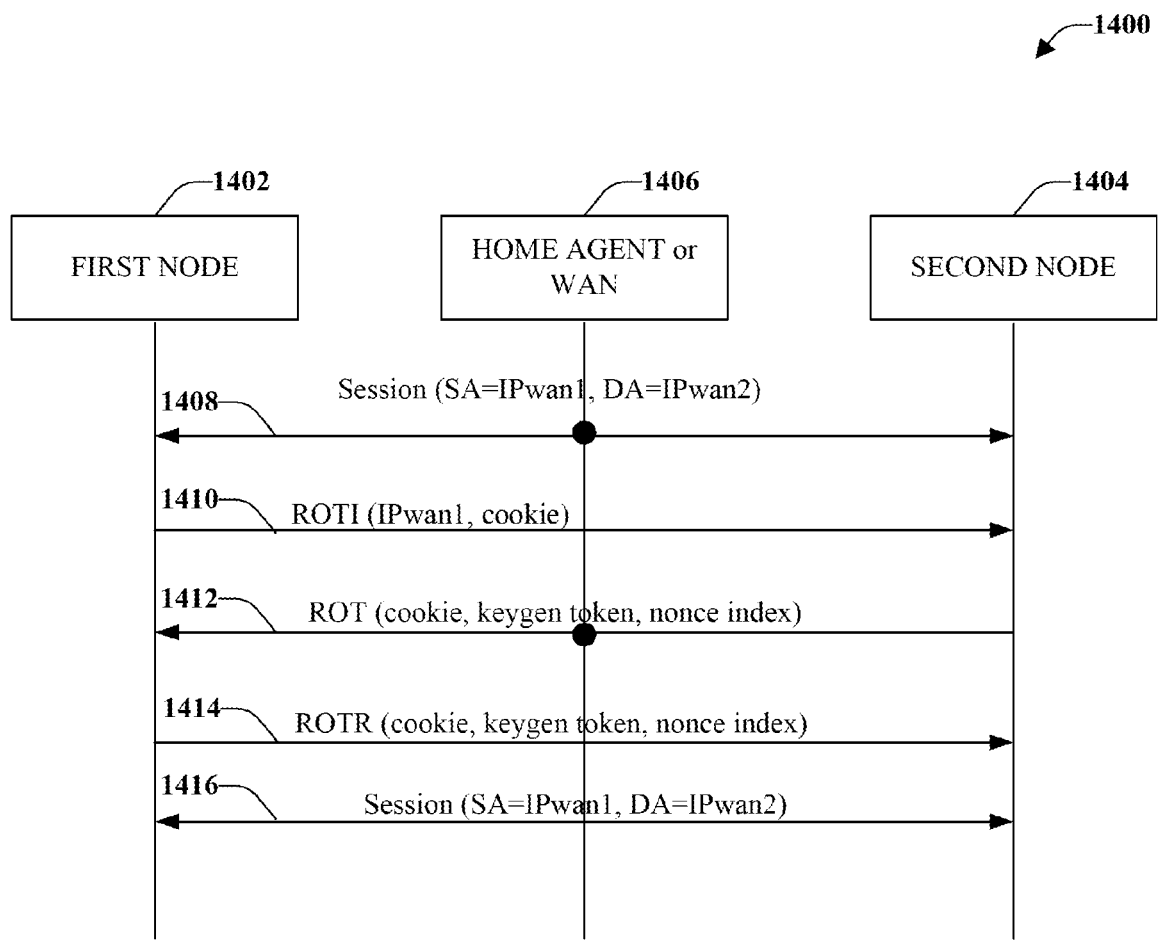
FIG. 14 illustrates a flow diagram for unified home-agent less route optimization signaling from a network path to a directly connected path, according to various aspects.

FIG. 14 illustrates a flow diagram 1400 for unified home-agent less route optimization signaling from a network path to a directly connected path, according to various aspects. The illustrated flow diagram 1400 is for switching from WAN to FlashLinQ®, however, it should be understood that other network paths and directly connected paths can be utilized with the disclosed aspects.

A first device 1402 is in communication with a second device 1404 though a home agent 1406 (or over a WAN interface). As indicated, at 1408, the session has a source address of IPwan1, destination address of IPwan2 (SA=IPwan1, DA=IPwan2).

RO signaling is used to exchange half keys. For example, at 1410, first device 1402 sends a route optimization test init (ROTI) message, which can include source address (IPwan1) and a cookie. ROTI message can be sent over a direct path (e.g., no home agent/WAN involvement). Second device 1404 can reply, through home agent/WAN with a route optimization test (ROT). ROT message can include a cookie, a keygen token, and a nonce index. In reply, first device 1402 sends a route optimization test response (ROTR) message over directly connected link. ROTR message can include a cookie, a keygen token, and a nonce index.

If second device 1404 receives the ROTR, the session is moved over the directly connected link (in this example FlashLinQ®), no tunneling is used. The key would only be utilized in this case if first device moves back to WAN.

Figure 15:
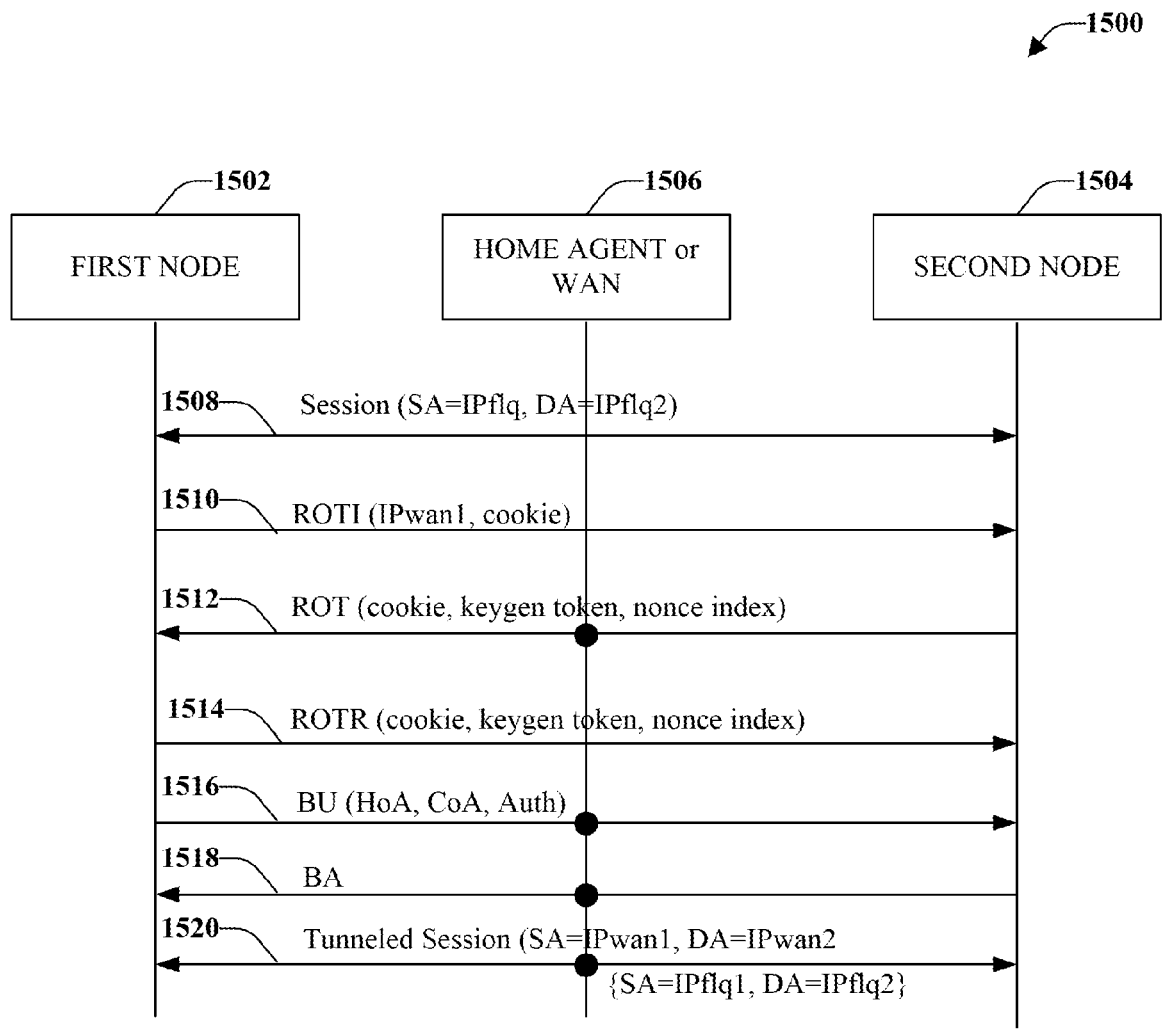
FIG. 15 illustrates a flow diagram for unified home-agent less route optimization signaling from a directly connected path to a network path, according to various aspects.

FIG. 15 illustrates a flow diagram 1500 for unified home-agent less route optimization signaling from a directly connected path to a network path, according to various aspects. The illustrated flow diagram 1500 is for switching from FlashLinQ® to WAN, however, it should be understood that other directly connected paths and network paths can be utilized with the disclosed aspects.

Included in flow diagram is a first node 1502, a second node 1504, and a home agent (WAN) 1506. First node 1502 and second node 1504 can be in communication over a directly connected path (e.g., FlashLinQ®) 1508. This session can have a source address of IPflq1 and a destination address of IPflq2 (SA=IPflq1, DA=IPflq2).

RO signaling can be utilized to exchange half keys and to test the return routability of IPwan1/IPwan2 addresses. First device sends, over the directly connected path, a route optimization test init (ROTI) message 1510. By sending ROTI message 1510, first node 1502 claims it owns address (IPwan1). The message 1510 can include a cookie. Second node 1504 replies, over the network path, with a route optimization test (ROT) message 1512. ROT message 1512 is sent using the IPwan2 address of second node 1504 and can include a cookie, a keygen token, and a nonce index. First node 1502 replies with a route optimization test response (ROTR) message that includes a cookie, a keygen token, and a nonce index.

A binding update (BU) can be sent by first node 1502 and second node 1504 can reply with a binding acknowledgement (BA). Both BU 1516 and BA 1518 are sent though the home agent/WAN 1506. More specifically, the binding update message 1516 binds the IPflq1 address with the IPwan1 address of first node 1502. Alternatively or additionally, second node 1504 can initiate a corresponding BU/BA exchange (not shown).

The session is moved to WAN link, at 1520, using tunneling Source Address (SA)=IPwan1, Destination Address (DA) =IPwan2, encapsulating SA=IPflq1, DA=IPflq2. The key generated during the ROTI/ROT/ROTR exchange is used to authenticate the BU/BA messages 1520/1518 as well as subsequent BU/BA messages if first node 1502 or second node 1504 moves to another IPwan address.

Figure 16:
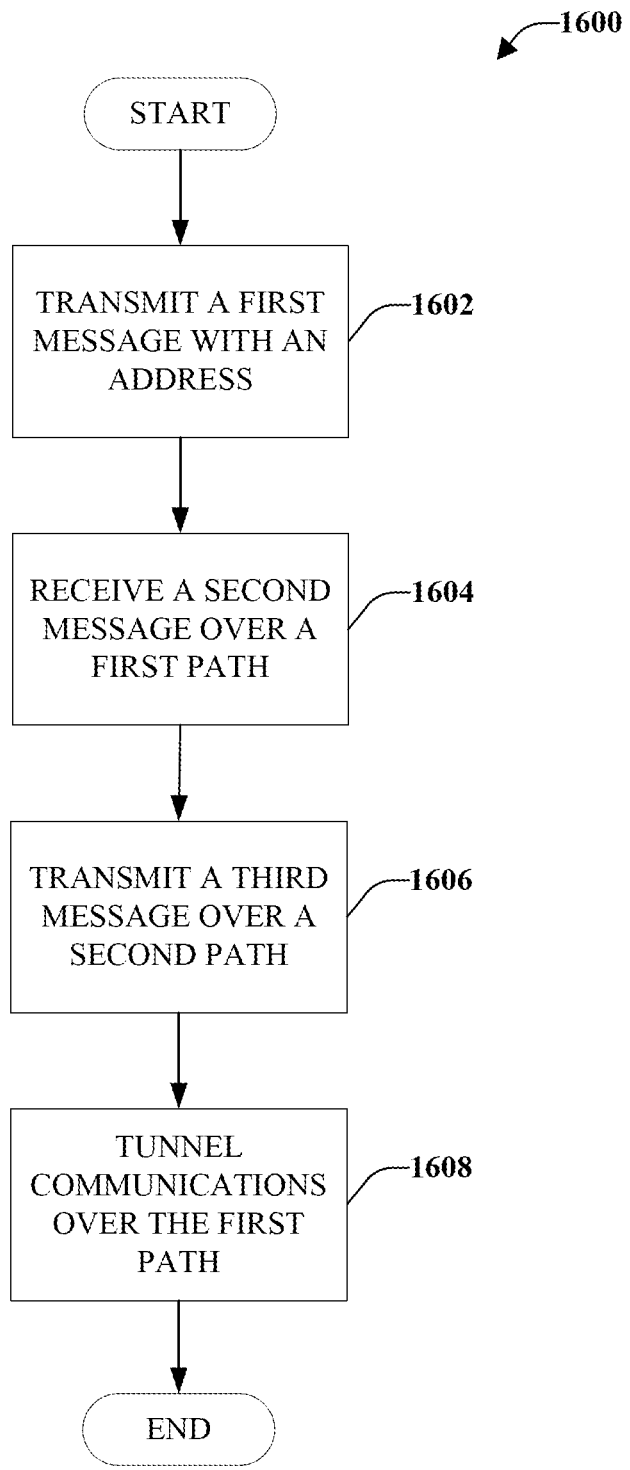
FIG. 16 illustrates a method for route optimization.

With reference now to FIG. 16, illustrated is a method 1600 for route optimization. Method 1600 can be performed by a communication apparatus or a first node. Method 1600 starts, at 1602, when a first message that includes an address is transmitted to a second node. The address can be a local address of first node. At 1604, a second message is received from second node. Second message can be received over a first path, which can be an untrusted link (or a global network link). Second message is received at the address and includes a first information element and a second information element. In accordance with some aspects, the first information element is a token and the second information element is a nonce index.

At 1606, a third message is transmitted over a second path to the second node. The second path can be a trusted link, such as a local network link. The third message is signed with the first information element and the second information element. At 1608, communications are tunneled to the second node over the first path. According to some aspects, the address can be created prior to sending the message, wherein the address corresponds to the second link. In accordance with some aspects, first message can be a Care-of Test Init Message, second message can be a Care-of Test Message, and third message can be a binding update.

Figure 17:
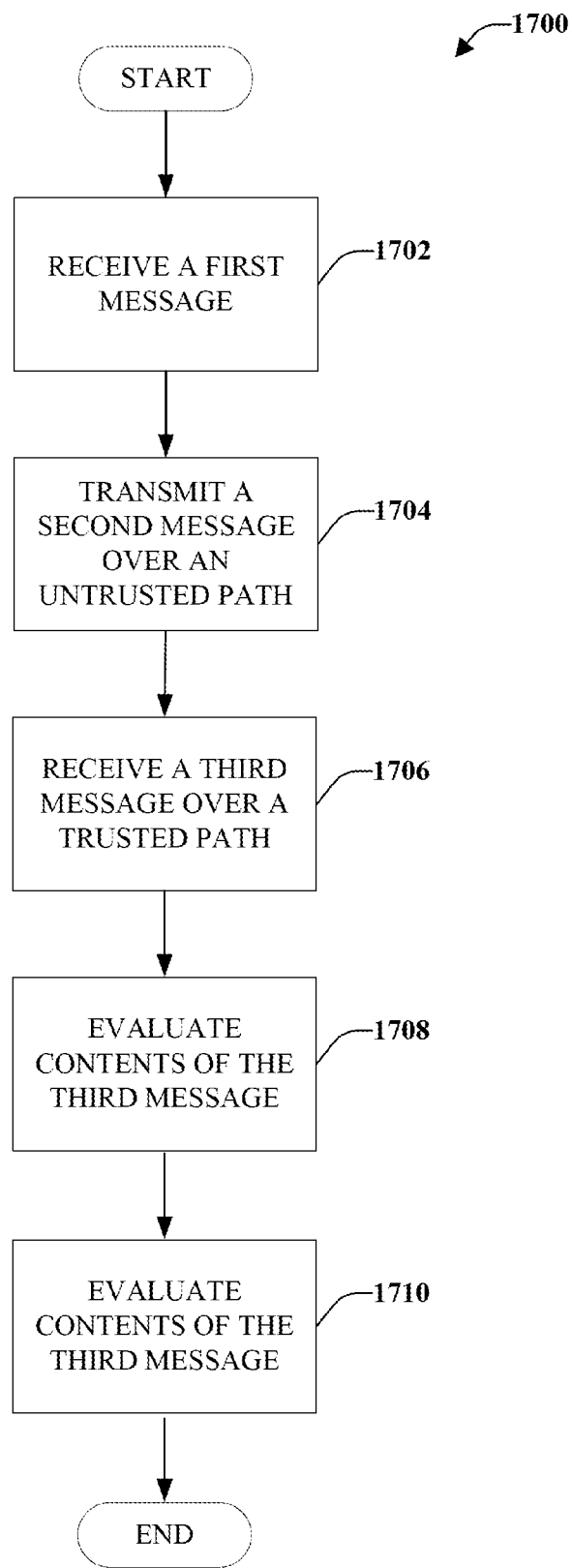
FIG. 17 illustrates a method performed by a first node for moving a communication session from a first network path to a second network path.

FIG. 17 illustrates a method 1700 performed by a first node for moving a communication session from a first network path to a second network path. At 1702, a first message is received from a second node with which a communication session might have already been established over a local network path. At 1704, a second message is transmitted to the second node. The second message can be transmitted over a first network path and can include a first information element and a second information element. The second message is transmitted to an address included in the first message. The address can be an address of the second node and is associated with a second network path. In accordance with some aspects, the first information element can be a token and the second information element can be a nonce index.

A third message from the second node is received, at 1706. The third message can be received over the second network path. At 1708, content of the third message is evaluated to determine if the third message is authenticated with the first information element and the second information element. If the third message is authenticated with the elements, at 1710, the communication session with the second node is tunneled over the first network path. In accordance with some aspects, the first network path is a global network path and the second network path is a local network path. According to some aspects, the first message is a Care-of Test Init Message, the second message is a Care-of Test Message, and the third message is a binding update.

Figure 18:
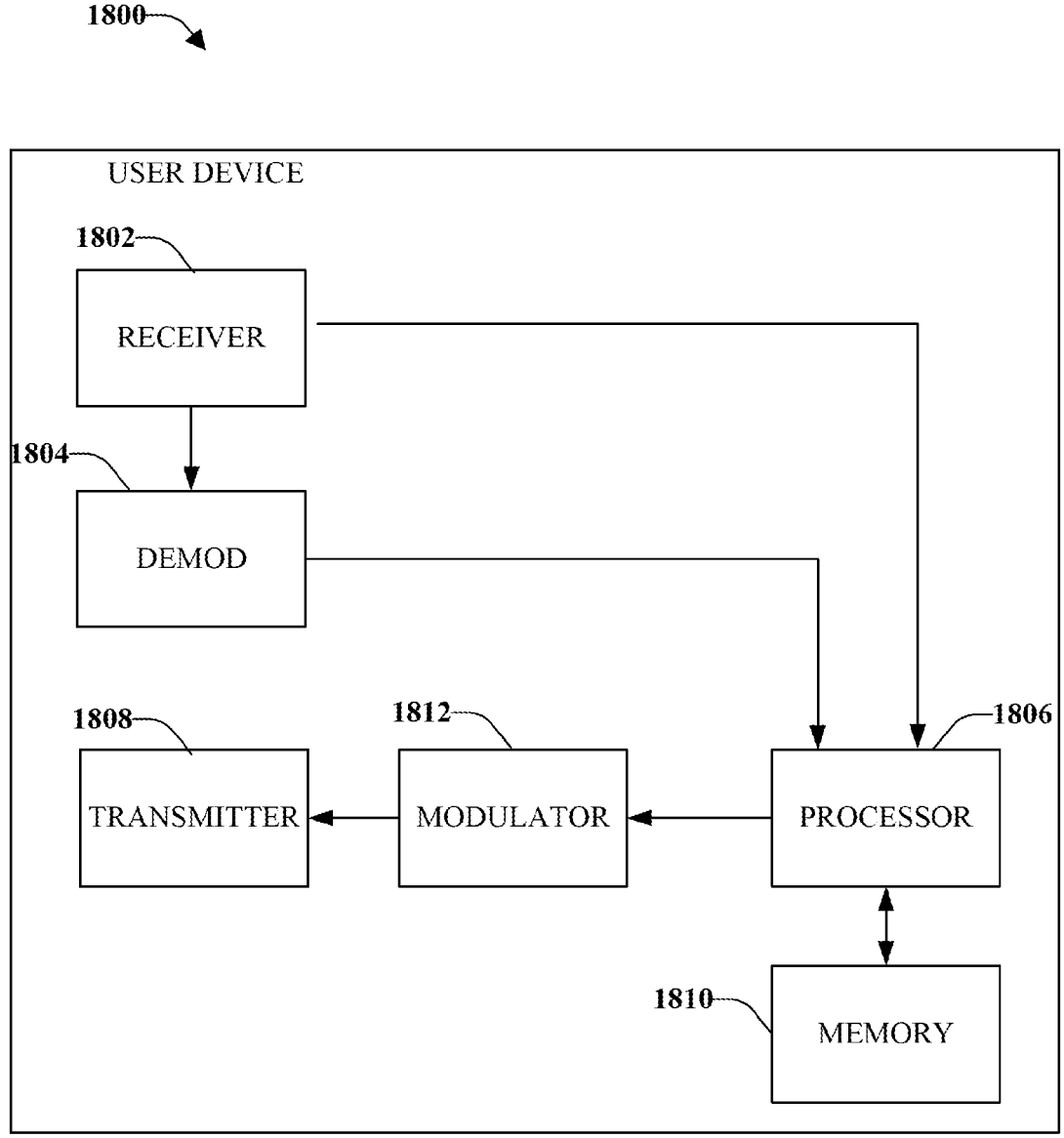
FIG. 18 illustrates a system that facilitates initiating a communication session over a first communication path and transferring that communication session to a second communication path in accordance with one or more of the disclosed aspects.

With reference now to FIG. 18, illustrated is a system 1800 that facilitates initiating a communication session over a first communication path and transferring that communication session to a second communication path in accordance with one or more of the disclosed aspects. System 1800 can reside in a user device and comprises a receiver 1802 that can receive a signal from, for example, a receiver antenna. The receiver 1802 can perform typical actions thereon, such as filtering, amplifying, downconverting, etc. the received signal. The receiver 1802 can also digitize the conditioned signal to obtain samples. A demodulator 1804 can obtain received symbols for each symbol period, as well as provide received symbols to a processor 1806.

Processor 1806 can be a processor dedicated to analyzing information received by receiver component 1802 and/or generating information for transmission by a transmitter 1808. In addition or alternatively, processor 1806 can control one or more components of user device 1800, analyze information received by receiver 1802, generate information for transmission by transmitter 1808, and/or control one or more components of user device 1800. Processor 1806 may include a controller component capable of coordinating communications with additional user devices.

User device 1800 can additionally comprise memory 1808 operatively coupled to processor 1806 and that can store information related to coordinating communications and any other suitable information. Memory 1810 can additionally store protocols associated with routing communications. User device 1800 can further comprise a symbol modulator 1812 and a transmitter 1808 that transmits the modulated signal.

Figure 19:
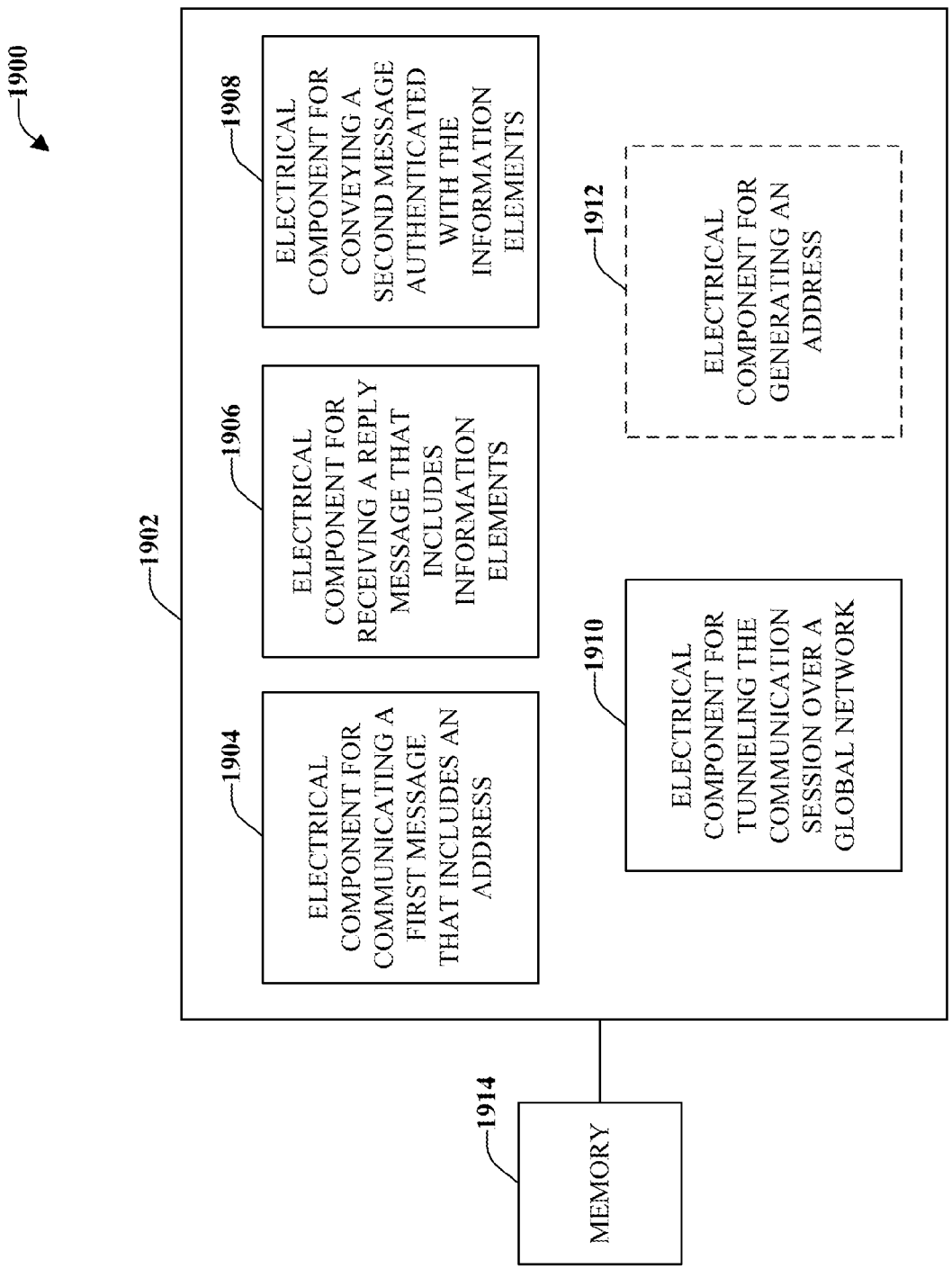
FIG. 19 illustrates a system that transfers a communication session from a local network to a global network, according to an aspect.

FIG. 19 illustrates a system 1900 that transfers a communication session from a local network to a global network, according to an aspect. System 1900 can reside at least partially within a communication apparatus. System 1900 includes a logical grouping 1902 of electrical components that can act separately or in conjunction. Logical grouping 1902 includes an electrical component 1904 for communicating a first message that includes an address. The first message can be sent to a peer node. Also included is an electrical component 1906 for receiving a reply message over a global network. The reply message includes a first information element and a second information element. In accordance with some aspects, the first information element is a token and the second information element is a nonce index.

Also included in logical grouping 1902 is an electrical component 1908 for conveying a second message over the local network. The second message is authenticated with the first information element and the second information element. Also included is an electrical component 1910 for tunneling the communication session over the global network. In accordance with some aspects, the local network is a trusted path and the global network is an untrusted path.

System 1900 also includes a memory 1914 that retains instructions for executing functions associated with electrical components 1904, 1906, 1908, 1910, and 1912, or other components. While shown as being external to memory 1914, it is to be understood that one or more of electrical components 1904, 1906, 1908, 1910, and 1912 can exist within memory 1914.

Figure 20:
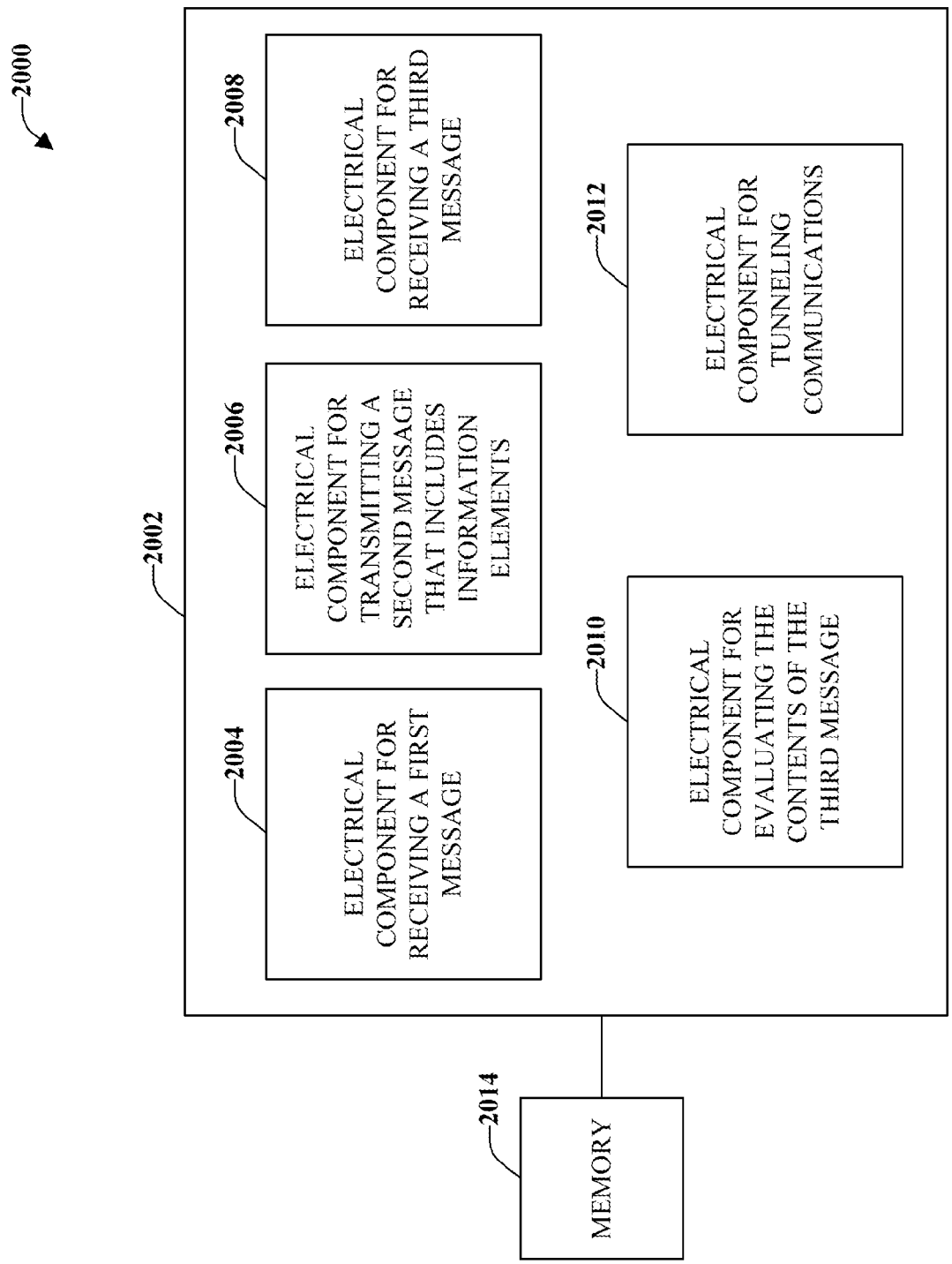
FIG. 20 illustrates a system that transfers a communication session from a local network to a global network, according to an aspect.

FIG. 20 illustrates a system 2000 that transfers a communication session from a local network to a global network, according to an aspect. System 2000 can reside at least partially within a communication apparatus or a first node. System 2000 includes a logical grouping 2002 of electrical components that can act separately or in conjunction.

Logical grouping 2002 includes an electrical component 2004 for receiving a first message from a peer node. The first message includes an address that is associated with a trusted path. Also included is an electrical component 2006 for transmitting a second message to the second node. The second message can be sent over a first path and includes a first information element and a second information element. In accordance with some aspects, the first information element is a token and the second information element is a nonce index.

Also included in logical grouping 2002 is an electrical component 2008 for receiving a third message for the second node. The third message can be received over a second path. Logical grouping 2002 also includes an electrical component 2010 for evaluating the contents of the third message to ascertain if the third message is signed with the first information element and the second information element. If the third message is authenticated with the information elements, an electrical component 2012 tunnels communications with the second node over the first path. In accordance with some aspects, the first path is a global network path and the second path is a local network path.

System 2000 also includes a memory 2014 that retains instructions for executing functions associated with electrical components 2004, 2006, 2008, 2010, and 2012, or other components. While shown as being external to memory 2014, it is to be understood that one or more of electrical components 2004, 2006, 2008, 2010, and 2012 can exist within memory 2014.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a first node for route optimization, comprising:
    employing a processor executing instructions stored on a computer readable storage medium to implement the following:
        transmitting to a second node a first message that includes an address;
        receiving a second message from the second node over an untrusted link, wherein the second message is received at the address and includes a first information element and a second information element;
        transmitting a third message to the second node over a trusted link, wherein the third message is signed with the first information element and the second information element; and
        tunneling communications to the second node over the untrusted link,
        wherein the untrusted link is a global network path from the first node to the second node and the trusted link is a local network path from the first node to the second node, wherein the local network path does not include the global network path.

2. The method of claim 1, wherein the first message is a Care-of Test Init Message, the second message is a Care-of Test Message, and the third message is a binding update.

3. The method of claim 1, wherein the first information element is a token and the second information element is a nonce index.

4. The method of claim 1, wherein the address is a local address of first node.

5. The method of claim 1, further comprises creating an address that corresponds to the trusted link prior to transmitting the first message.

6. A communication apparatus, comprising:
a memory that retains instructions related to sending to a peer node a first message that includes an address, receiving from the peer node a second message that includes a first information element and a second information element, and sending a third message that is signed by the first information element and the second information element, wherein the second message is received at the address over an untrusted path and the third message is sent over a trusted path, and tunneling communications to the peer node over the untrusted path; and
a processor, coupled to the memory, configured to execute the instructions retained in the memory,
wherein the untrusted path is a global network path and the trusted path is a local network path that does not include the global network path.

7. The communication apparatus of claim 6, wherein the first information element is a token and the second information element is a nonce index.

8. The communication apparatus of claim 6, the memory further retains instructions related to creating an address that corresponds to the trusted link prior to sending the first message.

9. A communication apparatus that transfers a communication session from a local network to a global network, comprising:
means for communicating a first message that includes an address;
means for receiving a reply message over the global network, wherein the reply message is received at the address and includes a first information element and a second information element;
means for conveying a second message over the local network, the second message is authenticated with the first information element and the second information element; and
means for tunneling the communication session over the global network,
wherein the local network is not connected to the global network, and
wherein the global network is an untrusted path and the local network is a trusted path that does not include the untrusted path.

10. The communication apparatus of claim 9, wherein the first information element is a token and the second information element is a nonce index.

11. The communication apparatus of claim 9, further comprises means for generating an address that corresponds to the local network.

12. A computer program product, comprising:
a non-transitory computer-readable medium comprising:
a first set of codes for causing a computer to initiate a communication session with a peer node over a local network path that does not include a global network path;
a second set of codes for causing the computer to determine the communication session should be moved to the global network path;
a third set of codes for causing the computer to send to the peer node a first message that includes an address that corresponds to the local network path;
a fourth set of codes for causing the computer to receive a second message from the peer node over the global network path, wherein the second message is received at the address and includes a first information element and a second information element;
a fifth set of codes for causing the computer to convey a third message to the peer node, wherein the third message is sent over the local network path and is authenticated with the first information element and the second information element; and
a sixth set of codes for causing the computer to tunnel communications to the peer node over the global network path.

13. At least one processor configured to initiate a communication session over a local network path and switch the communication session to a global network path, comprising:
a first module for establishing a communication session with a peer node over a local network path that does not include a global network path;
a second module for deciding to switch the communication session to the global network path;
a third module for conveying a first message to the peer node, the first message includes an address that corresponds to the local network path;
a fourth module for receiving a reply message from the peer node, wherein the reply message is received at the address over the global network path and includes a token and a nonce index;
a fifth module for transmitting a second message to the peer node, wherein the second message is transmitted over the local network path and is authenticated with the token and the nonce index; and
a sixth module for tunneling communications to the peer node over the global network path.

14. A method performed by a first node for moving a communication session from a first network path to a second network path, comprising:
employing a processor executing instructions stored on a computer readable storage medium to implement the following:
receiving a first message from a second node, the first message includes an address;
transmitting a second message to the second node, wherein the second message is transmitted to the address over a first network path and includes a first information element and a second information element;
receiving a third message from the second node, wherein the third message is received over a second network path;
determining the third message is signed with the first information element and the second information element; and
tunneling the communication session with the second node over the first network path,
wherein the first network path is a global network path from the first node to the second node and the second network path is a local network path from the first node to the second node, wherein the local network path does not include the global network path.

15. The method of claim 14, wherein the first message is a Care-of Test Init Message, the second message is a Care-of Test Message, and the third message is a binding update.

16. The method of claim 14, wherein the address is an address of the first node and is associated with the second network path.

17. The method of claim 14, wherein the communication is not tunneled over the first network path if the third message is not signed with the first information element and the second information element.

18. The method of claim 14, wherein the first information element is a token and the second information element is a nonce index.

19. A communication apparatus, comprising:
a memory that retains instructions related to establishing a communication session with a peer node over a local network that is not connected to a global network, receiving a first message that includes an address, sending a reply message to the address over the global network, wherein the reply message includes a first information element and a second information element, receiving a second message over the local network, determining the second message is authenticated with the first information element and the second information element, and tunneling communications with the peer node over the global network; and
a processor, coupled to the memory, configured to execute the instructions retained in the memory,
wherein the global network is an untrusted communication path and the local network is a trusted communication path that does not include the untrusted communication path.

20. The communication apparatus of claim 19, wherein the first information element is a token and the second information element is a nonce index.

21. The communication apparatus of claim 19, wherein the address is associated with the trusted path and the peer node.

22. A communication apparatus that transfers a communication session from a local network to a global network, comprising:
means for receiving a first message from a peer node, wherein the first message includes an address;
means for transmitting a second message to the second node, wherein the second message is sent to the address over a first path and includes a first information element and a second information element;
means for receiving a third message from the second node, wherein the third message is received over a second path;
means for ascertaining the third message is signed with the first information element and the second information element; and
means for tunneling communications with the second node over the first path,
wherein the first path is a global network path and the second path is a local network path that does not include the global network path.

23. The communication apparatus of claim 22, wherein the address is associated with the second path.

24. A computer program product, comprising:
a non-transitory computer-readable medium comprising:
a first set of codes for causing a computer to initiate a communication session with a peer node over a local network path that does not include a global network path;
a second set of codes for causing the computer to receive from the peer node a first message that includes an address that corresponds to the local network path;
a third set of codes for causing the computer to transmit a second message to the address over the global network path, wherein the second message includes a first information element and a second information element;
a fourth set of codes for causing the computer to receive a third message over the local network path;
a fifth set of codes for causing the computer to determine the third message is authenticated with the first information element and the second information element; and
a sixth set of codes for causing the computer to tunnel communications to the peer node over the global network path.

25. At least one processor configured to initiate a communication session over a local network path and switch the communication session to a global network path, comprising:
a first module for establishing a communication session with a peer node over a local network path that does not include a global network path;
a second module for receiving a first message from the peer node, wherein the first message includes an address that corresponds to the local network path;
a third module for sending a reply message to the address, wherein the second message is sent to the address over the global network path and includes a token and a nonce index;
a fourth module for receiving a second message, wherein the second message is received over the local network path;
a fifth module for determining the second message is authenticated with the token and the nonce index; and
a sixth module for tunneling communications over the global network path.

* * * * *